(12) United States Patent
Park et al.

(10) Patent No.: US 9,131,405 B2
(45) Date of Patent: Sep. 8, 2015

(54) METHOD OF TRANSMITTING AND RECEIVING CHANNEL STATUS INFORMATION ON MULTI-CELL OPERATION IN A WIRELESS COMMUNICATION SYSTEM AND APPARATUS FOR THE SAME

(75) Inventors: Jonghyun Park, Anyang-si (KR); Kijun Kim, Anyang-si (KR); Seungmin Lee, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 13/980,238

(22) PCT Filed: Jan. 31, 2012

(86) PCT No.: PCT/KR2012/000736
§ 371 (c)(1),
(2), (4) Date: Jul. 17, 2013

(87) PCT Pub. No.: WO2012/105793
PCT Pub. Date: Aug. 9, 2012

(65) Prior Publication Data
US 2013/0294352 A1    Nov. 7, 2013

Related U.S. Application Data

(60) Provisional application No. 61/438,241, filed on Jan. 31, 2011.

(51) Int. Cl.
*H04W 24/10* (2009.01)
*H04B 7/02* (2006.01)
*H04B 7/06* (2006.01)
*H04L 1/00* (2006.01)
(Continued)

(52) U.S. Cl.
CPC ............. *H04W 24/10* (2013.01); *H04B 7/024* (2013.01); *H04B 7/0626* (2013.01); *H04L 1/0026* (2013.01); *H04L 1/0035* (2013.01); *H04B 7/0469* (2013.01); *H04J 11/0053* (2013.01); *H04L 5/0057* (2013.01); *H04W 52/40* (2013.01)

(58) Field of Classification Search
CPC .... H04L 1/0026; H04L 1/0035; H04B 7/024; H04B 7/0626
See application file for complete search history.

(56) References Cited

U.S. PATENT DOCUMENTS

2010/0234037 A1* 9/2010 Terry et al. .................... 455/450
2010/0273514 A1  10/2010 Koo et al.
2012/0230274 A1*  9/2012 Xiao et al. .................... 370/329

OTHER PUBLICATIONS

Ericsson et al., "Physical Layer Parameters to be Configured by RRC," 3GPP TSG-RAN WG2 #72, Agenda Item 7.1.3.2, Tdoc R2-106465, Nov. 15-19, 2010, Jacksonville, Florida, 18 pages.
(Continued)

*Primary Examiner* — Mark Rinehart
*Assistant Examiner* — Gbemileke Onamuti
(74) *Attorney, Agent, or Firm* — Birch, Stewart, Kolasch & Birch, LLP

(57) ABSTRACT

The present invention relates to a wireless communication system. And, a method of transmitting and receiving channel status information on a multi-cell operation in a wireless communication system and apparatus for the same are disclosed. The present invention may include determining a report type of channel status information on multi-cell operation and transmitting/receiving the channel status information corresponding to the determined channel status information report type via uplink data channel.

13 Claims, 11 Drawing Sheets

Aperiodic CSI reporting for serving-cell (CSI request field='01')

Aperiodic CSI reporting for cooperating-cell(s) (CSI request field='10')

Aperiodic CSI reporting for serving-cell & cooperating-cell(s) (CSI request field='11')

(51) Int. Cl.
    *H04W 52/40*   (2009.01)
    *H04J 11/00*   (2006.01)
    *H04B 7/04*    (2006.01)
    *H04L 5/00*    (2006.01)

(56) References Cited

OTHER PUBLICATIONS

Qualcomm Inc., "PUCCH 201 LTE-A MIMO Feedback Performance Evaluation," 3GPP TSG-RAN WG1 #63, Agenda Item 6.3.2.1, R1-106355, Nov. 15-19, 2010, Jacksonville, Florida, 5 pages.

Qualcomm Incorporated, "CSI Measurement Reference," 3GPP TSG-RAN WG1 #62bis, Agenda Item 6.2.2.2, R1-110337, Jan. 17-21, 2011, Dublin, Ireland, 7 pages.

3rd Generation Partnership Project; Technical Specification Group Radio Access Network; Evolved Universal Terrestrial Radio Access (E-UTRA); Multiplexing and Channel Coding (Release 12), 3GPP TS 36.212, V12.3.0, Dec. 2014, 89 pages.

3rd Generation Partnership Project; Technical Specification Group Radio Access Network; Evolved Universal Terrestrial Radio Access (E-UTRA); Physical Channels and Modulation (Release 12), 3GPP TS 36.211, V12.4.0, Dec. 2014, 124 pages.

3rd Generation Partnership Project; Technical Specification Group Radio Access Network; Evolved Universal Terrestrial Radio Access (E-UTRA); Physical Layer Procedures (Release 12), 3GPP TS 36.213, V12.4.0, Dec. 2014, 225 pages.

* cited by examiner (a)

(b)

US 9,131,405 B2

METHOD OF TRANSMITTING AND RECEIVING CHANNEL STATUS INFORMATION ON MULTI-CELL OPERATION IN A WIRELESS COMMUNICATION SYSTEM AND APPARATUS FOR THE SAME

CROSS REFERENCE TO RELATED APPLICATIONS

This application is the National Phase of PCT/KR2012/000736 filed on Jan. 31, 2012, which claims priority under 35 U.S.C. 119(e) to U.S. Provisional Application No. 61/438,241 filed on Jan. 31, 2011, all of which are incorporated by reference herein in its entirety.

TECHNICAL FIELD

The present invention relates to a wireless communication system, and more particularly, to a method of transmitting and receiving channel status information on a multi-cell operation in a wireless communication system and apparatus for the same.

BACKGROUND ART

Generally, MIMO (multi-input multi-output) technique means a method of improving transceived data efficiency by adopting MIMO transmitting antennas and MIMO receiving antennas instead of a single transmitting antenna and a single receiving antenna. If a single antenna is used, a receiving side receives data via a single antenna path. If multi-antennas are used, a receiving side may be able to receive data via several paths. Therefore, data rate and throughput can be improved and coverage can be increased. Single-cell MIO operation can be categorized into SU-MOMO (single user-MIMO) scheme for a single user equipment to receive a downlink signal in one cell and MU-MIMO (multiuser-MIMO) scheme for at least two user equipments to receive a downlink signal in one cell.

Meanwhile, many ongoing efforts are made to research and develop coordinated multi-point (CoMP) system to improve throughput of a user on a cell boundary by applying improved MIMO transmission in multi-cell environment. If the CoMP system is applied, it may be able to reduce inter-cell interference in multi-cell environment and to improve overall system performance.

CoMP scheme may be categorized into JP (joint processing) scheme for enabling downlink data to be shared with all CoMP coordinating cells to be transmitted to a specific user equipment and CBF (coordinated beamforming) scheme having downlink data exist in one cell only. The JP scheme may be categorized again into JT (joint transmission) scheme for enabling all coordinating cells to join a signal transmission and CSL (cooperative silencing) scheme for one cell to join a signal transmission only in a manner that the rest of cells stop signal transmission to reduce interference. In the CBF scheme, each coordinating cell, which does not transmit a signal to a user equipment, is able to reduce inter-cell interference in a manner of determining a beamforming matrix of a user equipment, which receives a signal from the corresponding coordinating cell) to apply a less amount of interference to the corresponding user equipment.

DISCLOSURE

Technical Problem

In order for cells joining coordinated communications to perform communication with a user equipment correctly in CoMP operation, the user equipment is requested to feed back channel status information (CSI) on each of the cells joining the coordinated communications.

The technical task of the present invention is to provide a new method of feeding back CSI on uplink data channel (e.g., physical uplink shared channel (PUSCH)).

And, the technical task of the present invention is to provide a PUSCH based CSI feedback method available for various operating schemes including CoMP operation, non-CoMP operation, dynamic cell selection and the like.

Technical tasks obtainable from the present invention are non-limited the above-mentioned technical task. And, other unmentioned technical tasks can be clearly understood from the following description by those having ordinary skill in the technical field to which the present invention pertains.

Technical Solution

Accordingly, the present invention is directed to a method of transmitting and receiving channel status information on a multi-cell operation in a wireless communication system and apparatus for the same that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting CSI (channel status information), which is transmitted by a user equipment in a wireless communication system, according to one embodiment of the present invention may include the steps of determining at least one or more CSI report types for the CSI used for multi-cell operation and transmitting the CSI corresponding to one of the at least one or more CSI report types to a base station via uplink data channel.

To further achieve these and other advantages and in accordance with the purpose of the present invention, a method of receiving CSI (channel status information), which is received by a base station in a wireless communication system, according to another embodiment of the present invention may include the steps of determining at least one or more CSI report types for the CSI used for multi-cell operation and receiving the CSI corresponding to one of the at least one or more CSI report types from a user equipment via uplink data channel.

To further achieve these and other advantages and in accordance with the purpose of the present invention, a user equipment for transmitting CSI (channel status information) in a wireless communication system, according to one embodiment of the present invention may include a receiving module receiving a downlink signal from a base station, a transmitting module transmitting an uplink signal to the base station, and a processor controlling the user equipment including the receiving module and the transmitting module, the processor configured to determine at least one or more CSI report types for the CSI used for multi-cell operation, the processor configured to transmit the CSI corresponding to one of the at least one or more CSI report types to a base station via uplink data channel using the transmitting module.

To further achieve these and other advantages and in accordance with the purpose of the present invention, a base station for receiving CSI (channel status information) in a wireless communication system, according to a further embodiment of the present invention may include a receiving module receiving an uplink signal from a user equipment, a transmitting module transmitting a downlink signal to the user equipment, and a processor controlling the base station including the receiving module and the transmitting module, the processor configured to determine at least one or more CSI report types for the CSI used for multi-cell operation, the processor configured to receive the CSI corresponding to one of the at least one or more CSI report types from the user equipment via uplink data channel using the receiving module.

Preferably, the following items may apply to the above-mentioned embodiments of the present invention in common.

The user equipment may receive control information for requesting the CSI transmission and determine one of the at least one or more CSI report types based on the control information. In this case, the CSI transmitting step may be performed after prescribed duration from a timing point of receiving the control information.

The control information for requesting the CSI transmission may be received on a physical downlink control channel (PDCCH).

The user equipment may receive information on a report period and offset of the CSI transmission for each of the at least one or more CSI report types. And, the CSI transmitting step may be performed at a timing determined in accordance with the report period and offset.

The information on the report period and offset may be received by higher layer signaling.

The at least one or more CSI report types may be set by higher layer signaling or determined in advance.

The at least one or more CSI report types may include a wideband & subband coordinated multi-point (CoMP) CSI report type and a subband CoMP CSI report type.

The at least one or more CSI report types may include a CoMP CSI report type for at least one coordinating cell and a CoMP CSI report type for a serving cell and the at least one coordinating cell.

The at least one or more CSI report types may include a CoMP CSI report type for a $1^{st}$ cell set and a CoMP CSI report type for a $2^{nd}$ cell set.

Each of the $1^{st}$ cell set and the $2^{nd}$ cell set may include at least one of a serving cell joining the multi-cell operation and at least one coordinating cells.

The multi-cell may belong to a same base station or a plurality of base stations.

The uplink data channel may include a physical uplink shared channel (PUSCH).

It is to be understood that both the foregoing general description and the following detailed description are exemplary and explanatory and are intended to provide further explanation of the invention as claimed.

Advantageous Effects

According to embodiments of the present invention, a new method of feeding back CSI on an uplink data channel may be provided.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR INVENTION

Figure 1:
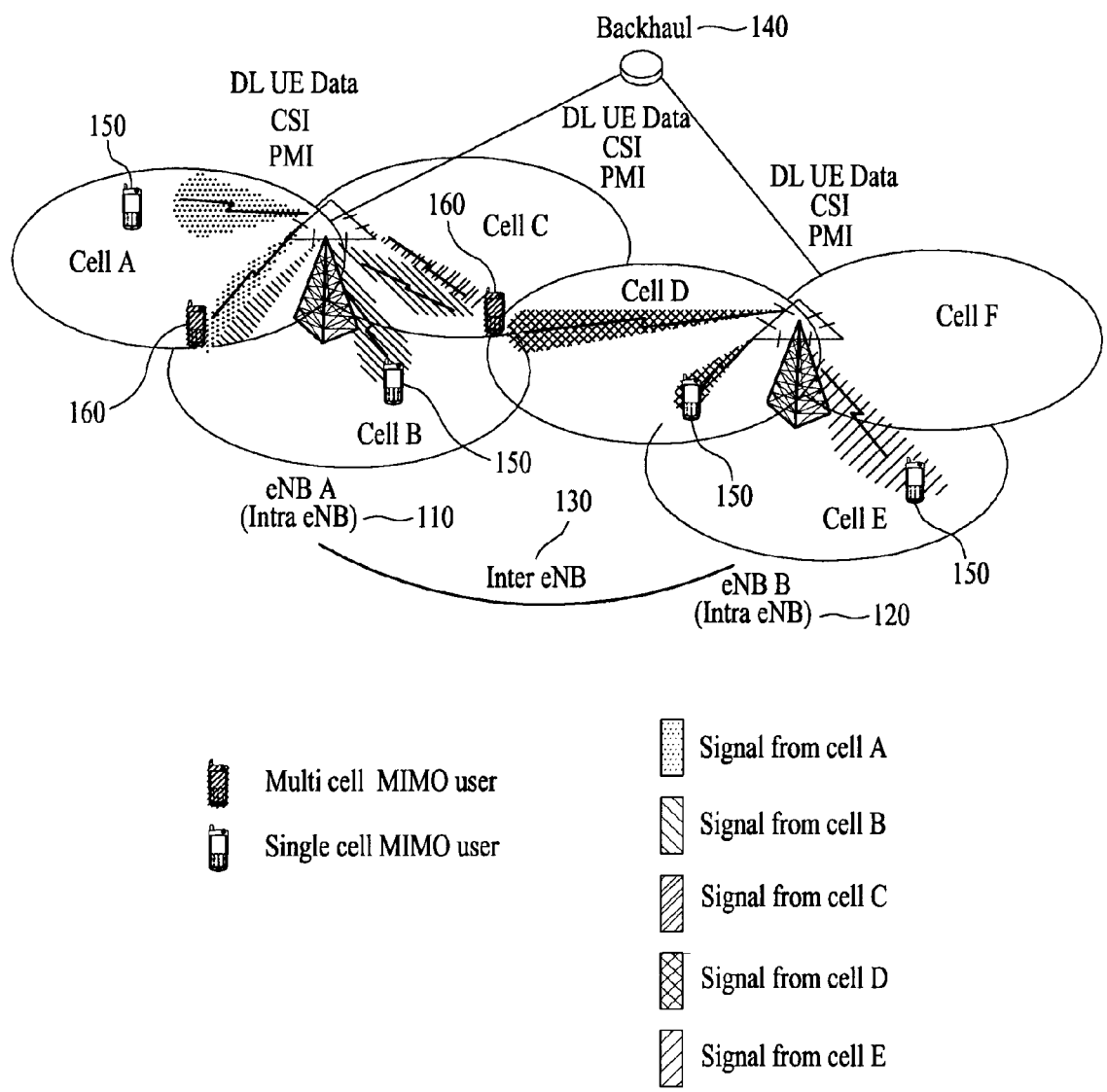
FIG. 1 is a diagram to conceptionally describe operation of a coordinated multi-point (CoMP) system.

The following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this disclosure, embodiments of the present invention are described centering on the data transmission/reception relations between a base station and a user equipment. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

In some cases, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

Coordinated Multi-Point (CoMP)

CoMP (coordinated multi-point) system is described with reference to FIG. 1 as follows. FIG. 1 is a conceptional diagram for CoMP (coordinated multi-point) operation of an intra eNB and an inter eNB according to a related art.

Referring to FIG. 1, intra eNBs 110 and 120 and an inter eNB 130 exist in a multi-cell environment. In LTE (long term evolution) system, an intra eNB is constructed with several cells or sectors. Cells belonging to an eNB, to which a specific user equipment belongs, have the relation of the intra eNBs 110 and 120 with the specific user equipment and. In particular, the cells sharing the same eNB with the cell having the user equipment belong thereto become the cells corresponding to the inter eNB 130. Thus, the cells (i.e., intra base stations), which are based on the same eNB of the specific user equipment, may exchange channel status information (CSI) with each other without a separate interface between schedulers of the cells. Yet, the cells (i.e., inter eNBs), which are based on other eNB, are able to exchange inter-cell information via a backhaul 140 and the like. Referring to FIG. 1, a single-cell MIMO user 150 in a single-cell communicates with one serving eNB in one cell (e.g., cell A, cell B, cell D, cell E). And, a multi-cell MIMO user 160 situated on a cell boundary is able to communicate with a plurality of serving eNBs in multi-cells (e.g., cell A and cell B, cell B, cell C and cell D).

In accordance with an improved system performance requirement of 3GPP LTE-A system, CoMP transmission/reception scheme (represented as one of co-MIMO (collaborative MIMO), network MIMO, etc.) has been proposed. CoMP may raise performance of a user equipment located at a cell edge and may raise average sector throughput as well.

Generally, in a multi-cell environment having a frequency reuse factor set to 1, the performance and average sector throughput of the user equipment located at the cell edge may be lowered due to inter-cell interference (ICI). In order to reduce the ICI, a conventional LTE system has applied a method of providing an appropriate throughput performance to a user equipment located at a cell edge in an environment restricted by interference using a simple manual scheme such as FFR (fractional frequency reuse) via UE-specific power control and the like. Yet, reducing the ICI or reusing the ICI as a signal desired by a user equipment may be more preferable than lowering a frequency resource use per cell. To achieve this object, CoMP transmission schemes may be applicable.

CoMP schemes applicable to a case of downlink may be mainly categorized into a joint processing (JP) scheme and a coordinated scheduling/coordinated beamforming (CS/CB) scheme.

According to the JP scheme, each point (e.g., base station) of CoMP cooperation unit may use data. And, the CoMP cooperation unit may mean a set of base stations used for the cooperative transmission scheme. Moreover, the JP scheme may be classified into a joint transmission scheme and a dynamic cell selection scheme.

The joint transmission scheme means a scheme of transmitting PDSCH from a plurality of points (portion or all of CoMP cooperation unit) at a time. In particular, data transmitted to a single user equipment may be simultaneously from a plurality of transmission points. According to the joint transmission scheme, a quality of a coherently or non-coherently received signal may be improved and interference on another user equipment may be actively eliminated.

The dynamic cell selection scheme may mean the scheme of transmitting PDSCH from one point (of CoMP cooperation unit) at a time. In particular, data transmitted to a single user equipment at a specific timing point is transmitted from one point, the rest of points in the cooperation unit at that timing point do not perform data transmission to the corresponding user equipment, and a point of transmitting data to the corresponding user equipment may be dynamically selected.

According to the CS/CB scheme, CoMP cooperation units may be able to cooperatively perform beamforming of data transmission to a single user equipment. In this case, although the data is transmitted from a serving cell only, user scheduling/beamforming may be determined by the coordination of cells of the corresponding CoMP cooperation unit.

Meanwhile, in case of uplink, coordinated multi-point reception means that a signal transmitted by coordination of a plurality of points geographically spaced apart from each other is received. CoMP schemes applicable to a case of uplink may be classified into joint reception (JR) and coordinated scheduling/coordinated beamforming (CS/CB).

The JR scheme means that a signal transmitted on PUSCH is received by a plurality of reception points. And, the CS/CB scheme means that user scheduling/beamforming is determined by coordination of cells of CoMP cooperation unit despite that PUSCH is received by one point only.

Using this CoMP system, a user equipment may be supported with data jointly from mult0cell base station. Each base station supports at least one or more user equipments simultaneously using the same radio frequency resource, thereby improving performance of system. And, the base station may be able to perform space division multiple access (SDMA) scheme based on channel status information between the base station and a user equipment.

In CoMP system, a serving base station and at least one or more coordinating base stations are connected with a scheduler via backbone network. The scheduler may operate by receiving a feedback of channel information on a channel status, which is measured by each base station, between each user equipment and each coordinating base station via the backbone network. For instance, the scheduler may be able to schedule information for cooperative MIMO operation for a serving base station and at least one coordinating base station. In particular, the scheduler may be able to directly instruct each base station on the cooperative MIMO operation.

As mentioned in the foregoing description, CoMP system may be operate as a virtual MIMO system by binding a plurality of adjacent cells into one group. Basically, a communication scheme of MIMO system using multi-antennas may be applicable. Operation of the MIMO system shall be described in detail later.

Downlink/Uplink Structure

Frame structure is described with reference to FIG. 1 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

Figure 2:
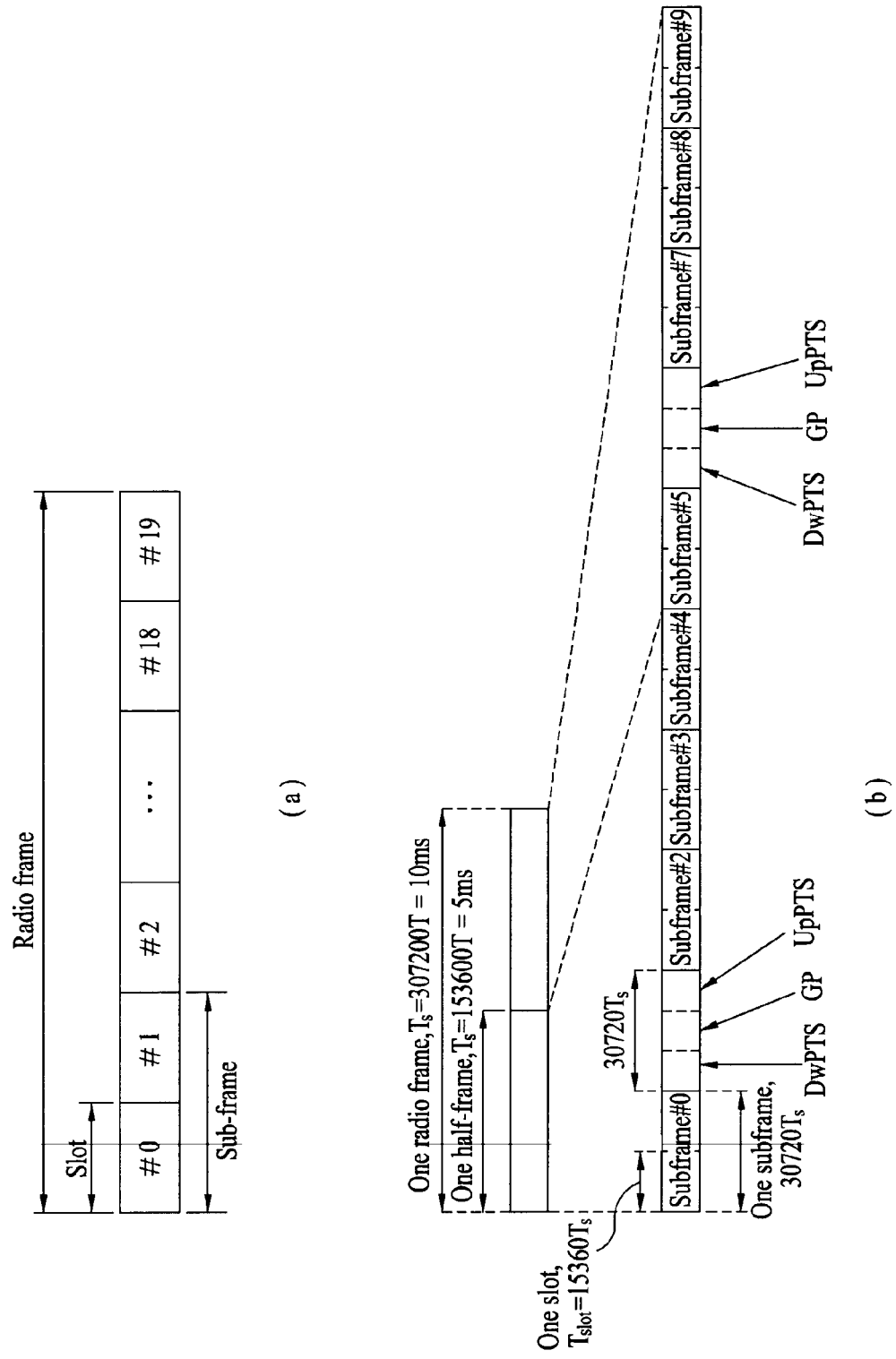
FIG. 2 is a diagram for a structure of a downlink radio frame.

FIG. 2 (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2 (b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, one subframe includes 2 slots irrespective of the type of the radio frame.

The above-described structures of the radio frame are just exemplary. And, the number of subframes included in a radio frame, the number of slots included in the subframe and the number of symbols included in the slot may be modified in various ways.

Figure 3:
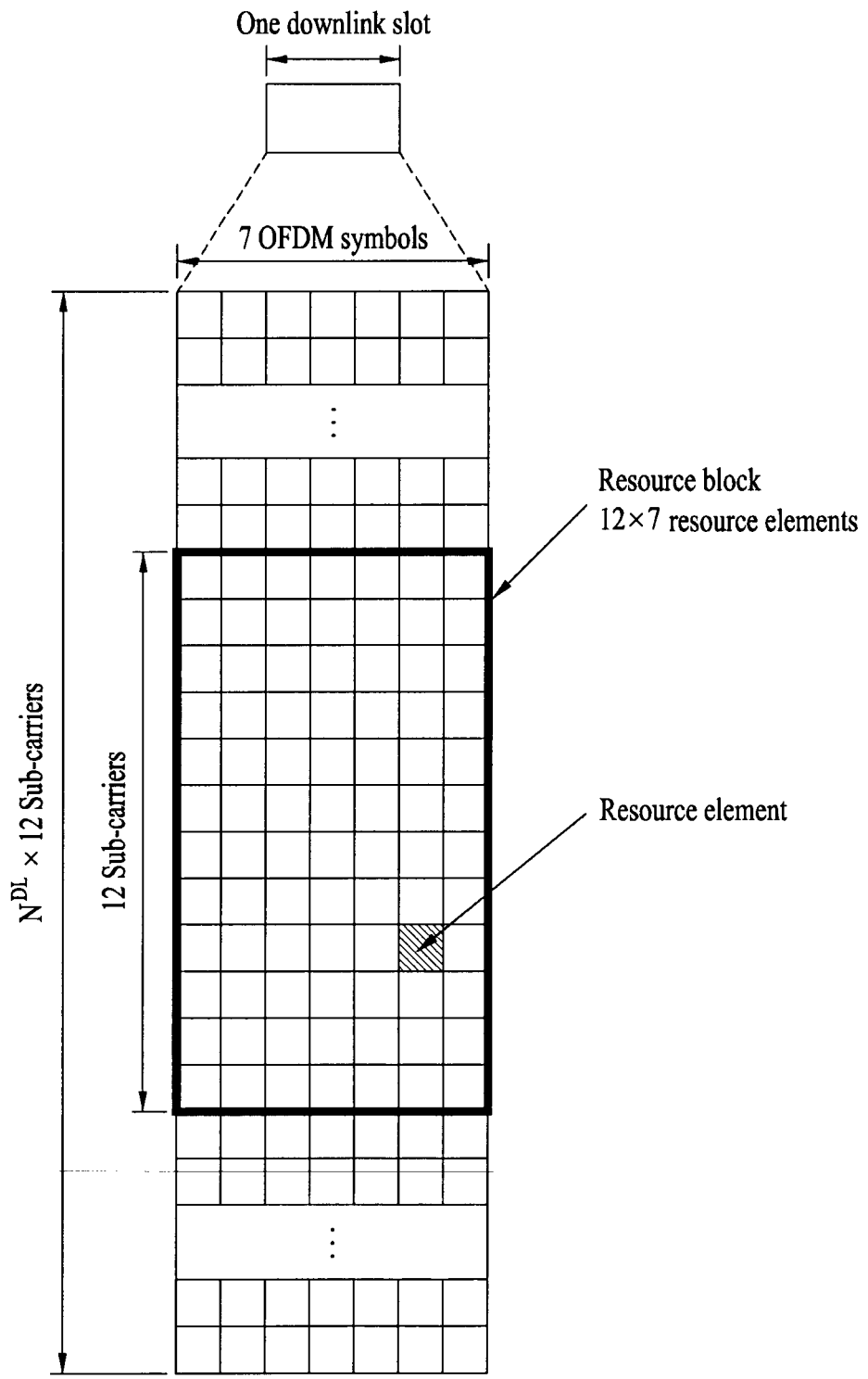
FIG. 3 is a diagram for one example of a resource grid in a downlink slot.

FIG. 3 is a diagram for one example of a resource grid for a downlink (DL) slot. Referring to FIG. 3, one downlink (DL) slot may include 7 OFDM symbols and one resource block (RB) may include 12 subcarriers, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). one resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
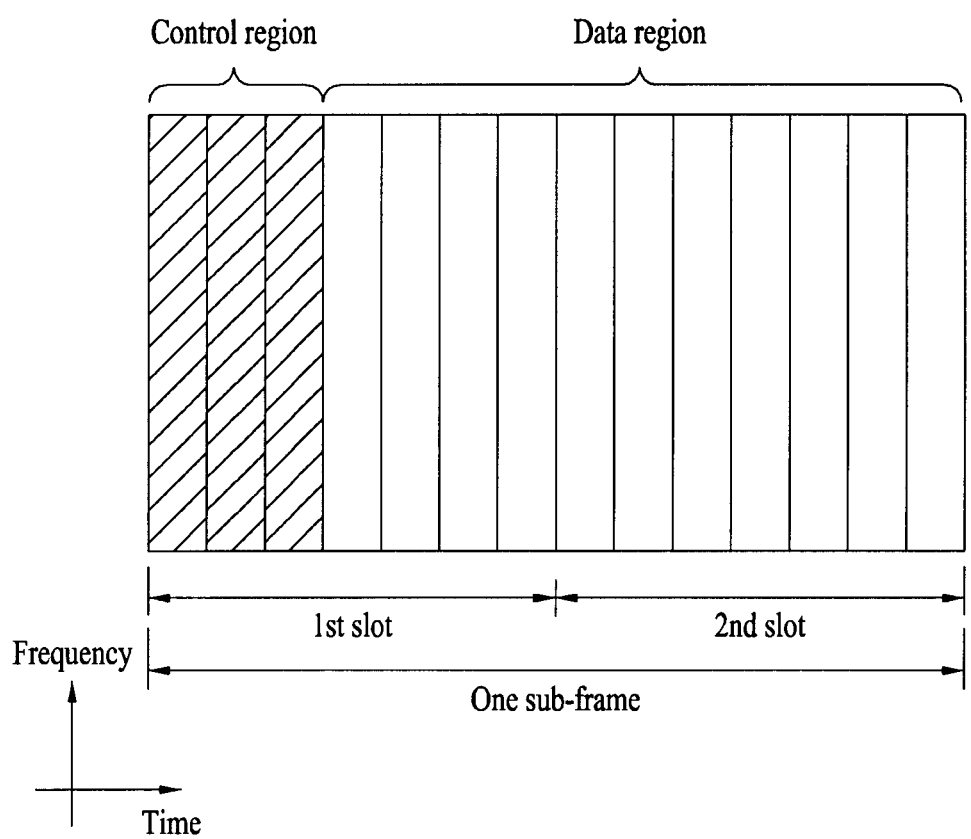
FIG. 4 is a diagram for a structure of a downlink subframe.

FIG. 4 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 5:
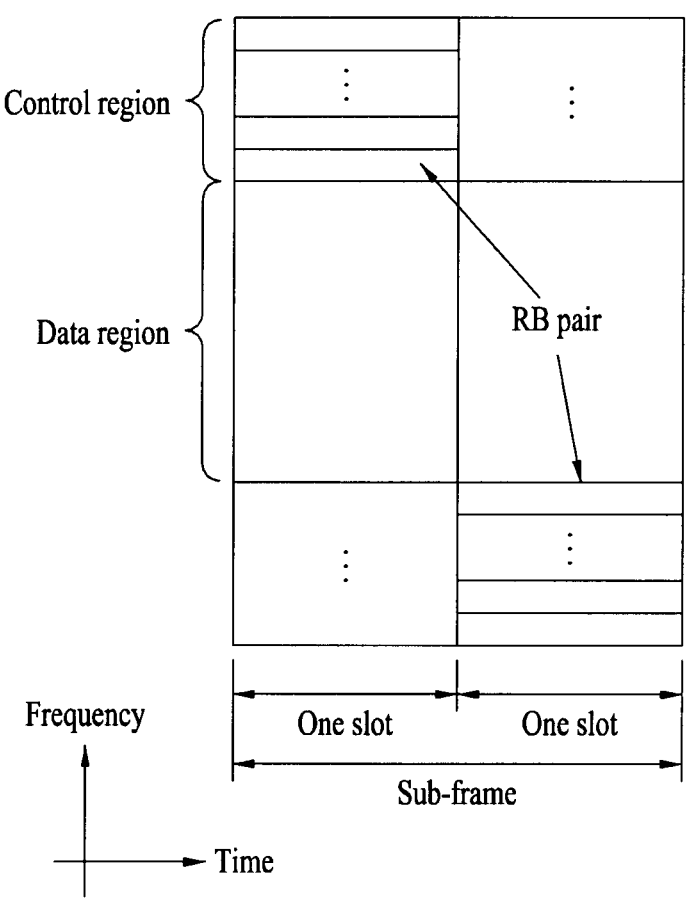
FIG. 5 is a diagram for an uplink subframe.

FIG. 5 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

Modeling of Multi-Antenna (MIMO) System

Figure 6:
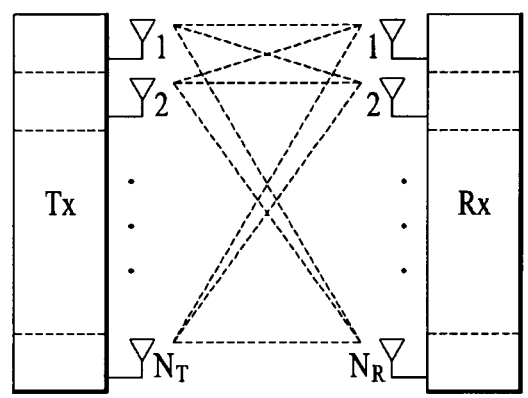
FIG. 6 is a block diagram for a configuration of a wireless communication system having multiple antennas.
Figure 6:
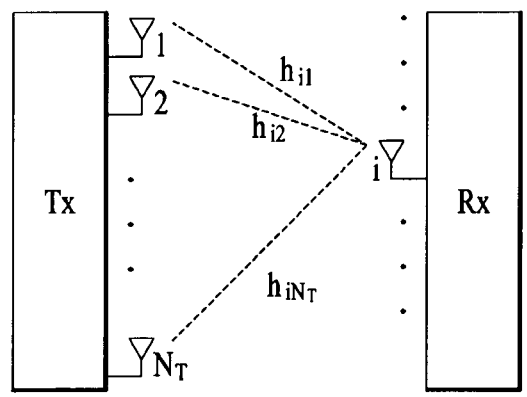

FIG. 6 is a diagram for a configuration of a wireless communication system including multiple antennas.

Referring to FIG. 6 (a), if the number of transmitting antennas is incremented into $N_T$ and the number of receiving antennas is incremented into $N_R$, theoretical channel transmission capacity is increased in proportion to the number of antennas unlike the case that a transmitter or receiver uses a plurality of antennas. Hence, a transmission rate may be enhanced and frequency efficiency may be remarkably raised. The transmission rate according to the increase of the channel transmission capacity may be theoretically raised by an amount resulting from multiplying a maximum transmission rate $R_O$ of the case of using a single antenna by a rate increasing rate $R_i$.

$$R_i = \min(N_T, N_R) \quad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many efforts are ongoing to be made to various techniques for drive it into substantial data rate improvement. Some of theses techniques are already adopted as standards for various wireless communications such as 3G mobile communications, a next generation wireless LAN and the like.

The trends for the MIMO relevant studies are explained as follows. First of all, many efforts are ongoing to be made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Assume that $N_T$ transmitting antennas and $N_R$ receiving antennas exist in this system.

First of all, a transmission signal is explained. If there are $N_T$ transmitting antennas, $N_T$ maximum transmittable informations exist. Hence, the transmission information may be represented as follows.

$$s = [s_1, s_2, \ldots, s_{N_T}]^T \quad \text{[Formula 2]}$$

Meanwhile, transmission power can be set different for each transmission information $s_1, s_2, \ldots, s_{N_T}$. If the respective transmission powers are set to $P_1, P_2, \ldots, P_{N_T}$, the transmission power adjusted transmission information may be represented as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, $\hat{s}$ may be represented as follows using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

If a weight matrix W is applied to the transmission power adjusted transmission information vector $\hat{s}$, a case of configuring $N_T$ transmission signals $x_1, x_2, \ldots, x_{N_T}$ actually transmitted may be taken into consideration as follows. In this case, the weight matrix W plays a role in properly distributing each transmission information to each antenna according to a transmission channel status and the like. The $x_1, x_2, \ldots, x_{N_T}$ may be represented as followings using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Formula 5]}$$

$$= W\hat{s} = WPs$$

In Formula 5, $w_{ij}$ indicates a weight between an $i^{th}$ transmitting antenna and a $j^{th}$ information. And, W may be called a precoding matrix.

When $N_R$ receiving antennas exist, if reception signals of the receiving antennas are set to $y_1, y_2, \ldots, y_{N_R}$, a reception signal vector can be represented as follows.

$$y = [y_1, y_2, \ldots, y_{N_R}]^T \quad \text{[Formula 6]}$$

If a channel is modeled in MIMO wireless communication system, the channel can be represented as an index of a transmitting antenna and an index of a receiving antenna. A channel between a transmitting antenna j and a receiving antenna i may be represented as $h_{ij}$. In the $h_{ij}$, it should be noted that a receiving antenna index is followed by a transmitting antenna index in order of index.

FIG. 6 (b) shows a channel to a receiving antenna i from each of $N_T$ transmitting antennas. These channels may be represented as a vector or matrix in a manner of tying the channels b together. Referring to FIG. 6 (b), the channels between the receiving antenna i and the $N_T$ transmitting antennas can be represented as follows.

$$h_i^T = [h_{i1}, h_{i2}, \ldots, h_{iN_T}] \quad \text{[Formula 7]}$$

Hence, all the channels arriving from $N_T$ transmitting antennas to $N_R$ relieving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Formula 8]}$$

In an actual channel, a transmission signal passes through a channel matrix H and then has AWGN (additive white Gaussian noise) added thereto. If white noses $n_1, n_2, \ldots, n_{N_R}$ respectively added to $N_R$ receiving antennas, the white noises $n_1, n_2, \ldots, n_{N_R}$ can be represented as follows.

$$n = [n_1, n_2, \ldots, n_{N_R}]^T \quad \text{[Formula 9]}$$

Hence, the reception signal vector may be expressed as follows through the above-mentioned formula modeling.

$$y = \begin{bmatrix} y_1 \\ y_2 \\ \vdots \\ y_i \\ \vdots \\ y_{N_R} \end{bmatrix} \quad \text{[Formula 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The above description mainly relates to a case that the MIMO communication system is used by a single user. Yet, it may be possible to obtain multiuser diversity in a manner of applying the MIMO communication system to a plurality of users. This may be described in brief as follows.

Meanwhile, the number of rows/columns of a channel matrix H indicating a channel state is dependent on the number of transmitting/receiving antennas. The number of rows in the channel matrix H is equal to the number $N_R$ of the receiving antennas. The number of columns in the channel matrix H is equal to the number $N_T$ of the transmitting antennas. In particular, the channel matrix H becomes $N_R \times N_T$ matrix.

A rank of matrix is defined as a minimum one of the number of independent rows and the number of independent columns. Hence, it may be impossible for a rank of matrix to become greater than the number of rows or columns. A rank (rank(H)) of a channel matrix H is restricted to the following.

$$\text{rank}(H) \leq \min(N_T, N_R) \quad \text{[Formula 11]}$$

For another definition of a rank, when Eigen value decomposition is performed on a matrix, a rank may be defined as the number of Eigen values except 0. Similarly, for a further definition of a rank, when singular value decomposition is performed, a rank may be defined as the number of singular values except 0. Hence, the physical meaning of a rank in a channel matrix may be regarded as a maximum number for sending different informations on a given channel.

In the description of this specification, 'rank' in MIMO transmission may indicate the number of paths for transmitting signals independently and 'number of layer(s)' may indicate the number of signal stream(s) transmitted via each path. Since a transmitting stage transmits layer amounting to the number of ranks used for signal transmission, a rank may have the same meaning of the number of layers unless mentioned especially.

Feedback of Channel Status Information (CSI) on DL Channel

MIMO system may be categorized into an open-lop system and a closed-loop system. The open-loop system may mean that a transmitting stage performs MIMO transmission without feedback of channel status information from MIMO receiving stage. The closed-loop system may mean that a transmitting stage performs MIMO transmission with feedback of channel status information from MIMO receiving stage. According to the closed-loop MIMO system, each of the transmitting stage and the receiving stage may be able to perform beamforming based on the channel status information to obtain a multiplexing gain of MIMO transmitting antennas. In order for the receiving stage (e.g., user equipment) to feed back channel status information, the transmitting stage (e.g., base station) may be able to allocate a UL control channel or a UL shared channel to the receiving stage (e.g., user equipment).

A channel status may be measured from a reference signal (hereinafter abbreviated RS). The reference signal is the signal known to both a transmitting stage and a receiving stage.

Using an extent of distortion of this reference signal received on a channel, the receiving stage may be able to find out channel information. In order to measure a DL channel status, it may be able to use a cell-specific reference signal (CRS) and/or a channel status information-reference signal (CSI-RS) and the like. The CSI-RS is defined for a system (e.g., LTE-A system) having an extended antenna configuration and a CSI-RS mapped position on a DL resource may be defined as a pattern differing per cell. The CSI-RS may be transmitted in a prescribed subframe (e.g., a prescribed cycle), whereas the CRS is transmitted in each frame. Information of such CSI-RS configuration as CSI-RS pattern, cycle and the like may be provided to a user equipment by a base station through a higher layer signal.

Meanwhile, fed-back channel status information (CSI) may include a rank indicator (RI), a precoding matrix index (PMI) and a channel quality indicator (CQI).

First of all, the RI is the information on a channel rank. A rank of a channel may mean a maximum number of layers (or streams) capable of carrying different informations via the same time-frequency resource. Since a rank value is mainly determined by long-term fading of a channel, it may be generally fed back in a cycle longer than that of the PMI or the CQI (i.e., less frequently).

The PMI is the information on a precoding matrix used for transmission from a transmitting stage. Precoding means that a transmission layer is mapped to a transmitting antenna. By the precoding matrix, layer-to-antenna mapping relation may be determined. The PMI corresponds to a precoding matrix index of a base station preferred by a user equipment with reference to such a metric as a signal-to-interference plus noise ratio (hereinafter abbreviated SINR) and the like. In order to reduce feedback overhead of precoding information, a transmitting stage and a receiving stage share a codebook containing various precoding matrixes with each other in advance and an index indicating a specific precoding matrix in the corresponding codebook may be fed back only.

The CQI is the information indicating a channel quality or a channel strength. The CQI may be represented as a predetermined MCS combination. In particular, a fed-back CQI index indicates a corresponding modulation scheme and a corresponding code rate. Generally, the CQI becomes a value that reflects a reception SINR obtainable in case that a base station configures a spatial channel using PMI.

A system (e.g., LTE-A system) that supports an extended antenna configuration considers obtaining additional multiuser diversity using multiuser-MIMO (MU-MIMO) scheme. Since an interference channel between user equipments multiplexed in antenna domain exists in the MU-MIMO scheme, when a base station performs a DL transmission using channel status information fed back by one user equipment among multiple users, it may be necessary to prevent interference from occurring on other user equipments. Hence, in order to correctly perform MU-MIMO operation, it may be necessary to feed back channel status information having accuracy higher than that of a single user-MIMO (SU-MIMO) scheme.

Thus, in order to measure and repot more accurate channel status information, a new CSI feedback scheme of improving the previous CSI including RI, PMI and CQI may apply. For instance, precoding information fed back by a receiving stage may be indicated by a combination of 2 PMIs. One (i.e., $1^{st}$ PMI) of the 2 PMIs has the attribute of long term and/or wideband and may be named W1. And, the other one (i.e., $2^{nd}$ PMI) of the 2 PMIs has the attribute of short term and/or subband and may be named W2. And, a final PMI may be determined by a combination (or function) of W1 and W2. For instance, if a final PMI is set to W, it may define 'W=W1*W2' or 'W=W2*W1'.

In this case, W1 reflects average property on frequency and/or time of a channel. Namely, W1 may be defined as channel status information that reflects property of a long-term channel on time, a wideband channel on frequency, or a wideband channel on frequency with long term on time. In order to schematically represent the property of W1, W1 may be named channel status information of long term-wideband property (or long term-wideband PMI) in this specification.

And, W2 reflects relatively instantaneous channel property compared to W1. Namely, W2 may be defined as channel status information that reflects property of a short-term channel on time, a subband channel on frequency, or a subband channel on frequency with short term on time. In order to schematically represent the property of W2, W2 may be named channel status information of short term-subband property (or short term-subband PMI) in this specification.

In order to determine a final precoding matrix W from two different attribute informations (e.g., W1 and W2) indicating channel statuses, it may be necessary to configure a separate codebook (e.g., a $1^{st}$ codebook for W1 and a $2^{nd}$ codebook for W2) containing precoding matrixes indicating channel informations of attributes, respectively. And, a type of the codebook configured in this manner may be called a hierarchical codebook. If a codebook for a final use is determined using the hierarchical codebook, it may be called hierarchical codebook transformation.

For example of a hierarchical codebook transforming scheme, it may be able to transform a codebook using a long term covariance matrix of a channel shown in Formula 12.

$$W = \mathrm{norm}(W1\,W2) \qquad \text{[Formula 12]}$$

In Formula 12, W1 (long term-wideband PMI) indicates an element (i.e., codeword) configuring a codebook (e.g., $1^{st}$ codebook) prepared to reflect channel information of long term-wideband attribute. In particular, the W1 corresponds to a precoding matrix contained in the $1^{st}$ codebook that reflects the channel information of the long term-wideband attribute. Meanwhile, W2 (short term-subband PMI) indicates an element (i.e., codeword) configuring a codebook (e.g., $2^{nd}$ codebook) prepared to reflect channel information of short term-subband attribute. In particular, the W2 corresponds to a precoding matrix contained in the $2^{nd}$ codebook that reflects the channel information of the short term-subband attribute. And, the W indicates a codeword of a final codebook. Moreover, 'norm (A)' indicates a matrix in which a norm per column of matrix A is normalized into 1.

W1 and W2 may have the configurations shown in Formula 13.

$$W1(i) = \begin{bmatrix} X_i & 0 \\ 0 & X_i \end{bmatrix} \qquad \text{[Formula 13]}$$

$$W2(j) = \overbrace{\begin{bmatrix} e_M^k & e_M^l & & e_M^m \\ & & \cdots & \\ \alpha_j e_M^k & \beta_j e_M^l & & \gamma_j e_M^m \end{bmatrix}}^{r\ columns}$$

(if rank = r)

In Formula 13, W1 may be defined as a block diagonal matrix type and each block is an identical matrix Xi. One block Xi may be defined as (Nt/2)×M matrix. In this case, Nt indicates the number of transmitting antennas. In Formula 13, $e_M^p$ (p=k, l, ..., m) of W2 is M×1 vector and indicates a vector including M vector components, in which $p^{th}$ component among the M vector components is 1 and the rest of the components are zero. If $e_M^p$ is multiplied by W1, since $p^{th}$ column is selected from columns of the W1, this vector may be called a selection vector. In this case, if a value of M increases, the number of vectors fed back at a time to represent a long term/wideband channel increases. Hence, feedback accuracy is raised. Yet, the bigger the M value becomes, the smaller a codebook size of W1 fed back in low frequency gets but the larger a codebook size of W2 fed back in high frequency gets. Hence, feedback overhead increases eventually. In particular, tradeoff exists between the feedback overhead and the feedback accuracy. Thus, it may be able to determine the M value in a manner that the feedback overhead is set not to increase excessively by maintaining the feedback accuracy appropriately. Meanwhile, $\alpha_j$, $\beta_j$ and $\gamma_j$ indicate prescribed phase values, respectively. In Formula 13, k, l and m are integers, respectively (where 1≤k, l, m≤M).

The codebook structure in Formula 13 is designed to appropriately reflect channel correlation property generated in case that an inter-antenna space is dense in using cross-polarized (X-pol) configuration (generally, a case that a distance between adjacent antennas is a half of signal wavelength). For instance, the cross-polarized antenna configuration may be represented as Table 1.

TABLE 1

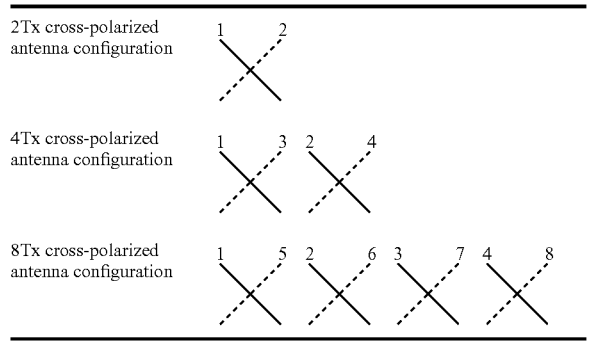

In Table 1, 8Tx cross-polarized configuration can be represented as configured with 2 orthogonally polarized antenna groups. In particular, antennas 1, 2, 3 and 4 of a $1^{st}$ antenna group may have the same polarization (e.g., vertical polarization), while antennas 5, 6, 7 and 8 of a $2^{nd}$ antenna group may have the same polarization (e.g., horizontal polarization). And, the two antenna groups are co-located. For instance, the antenna 1 and the antenna 5 are installed at the same location, the antenna 2 and the antenna 6 are installed at the same location, the antenna 3 and the antenna 7 are installed at the same location, and the antenna 4 and the antenna 8 are installed at the same location. In other words, antennas of one antenna group have the same polarization like ULA (uniform linear array) and inter-antenna correlation in one antenna group has the property of linear phase increment. And, correlation between antenna groups has property of phase rotation.

Since a codebook corresponds to a value resulting from quantizing a channel, it may be necessary to design a codebook by reflecting property of a real channel as it is. Thus, in order to describe that the real channel property is appropriately reflected by the codeword of the codebook designed as Formula 13, a rank 1 codebook is exemplarily explained as follows. Formula 14 shows one example of determining a final codeword W as a multiplication of a codeword W1 and a codeword W2 in case of rank 1.

$$W1(i) * W2(j) = \begin{bmatrix} X_i(k) \\ \alpha_j X_i(k) \end{bmatrix} \quad \text{[Formula 14]}$$

In Formula 14, a final codeword is represented as Nt×1 vector and structured with 2 vectors including an upper vector $X_i(k)$ and a lower vector $\alpha_j X_i(k)$. The upper vector $X_i(k)$ indicates correlation property of a horizontally polarized antenna group of cross-polarized antennas and the lower vector $\alpha_j X_i(k)$ indicates correlation property of a vertically polarized antenna group of the cross-polarized antennas. And, the $X_i(k)$ may be represented as a vector (e.g., DFT matrix) having linear phase increment by reflecting inter-antenna correlation property of each antenna group.

In case of using the above-mentioned codebook, channel feedback may have accuracy higher than that of a case of using a single codebook. Thus, single-cell MU-MIMO becomes possible using the channel feedback of the high accuracy. Due to similar reason, channel feedback of high accuracy is required for CoMP operation. For instance, in case of CoMP JT operation, since several base stations cooperatively transmit the same data to a specific user equipment (UE), it may be theoretically regarded as MIMO system in which a plurality of antennas are geographically distributed. In particular, when MIMO operation is performed in JT, like the single-cell MU-MIMO, high-level accuracy of channel information may be requested to avoid interference between co-scheduled user equipments. Moreover, in case of CoMP CB operation, accurate channel information is requested to avoid interference given to a serving cell by a neighbor cell.

PUSCH Feedback Reporting Mode

As mentioned in the foregoing description, CSI (i.e., RI, PMI, CQI, etc.) may be fed back to a base station from a user equipment periodically or aperiodically. The aperiodic CSI feedback may be performed via PUSCH. For the aperiodic CSI feedback, a base station may transmit control information for triggering a CSI feedback to a user equipment. For instance, CSI feedback triggering control information may be provided to a user equipment via CSI request field defined in UL grant (e.g., PDCCH DCI format 0, PDCCH DCI format 4, etc.). In the following description, PUSCH reporting mode in CSI feedback is explained in detail.

Single-cell based PUSCH feedback reporting mode may be represented as Table 2. Each mode may be defined in accordance with CQI feedback type and PMI feedback type.

TABLE 2

| | PMI Feedback Type | | |
|---|---|---|---|
| | No PMI | Single PMI | Multiple PMI |
| PUSCH CQI Feedback Type | | | |
| Wideband (wideband CQI) | | | Mode 1-2 |
| UE Selected (subband CQI) | Mode 2-0 | | Mode 2-2 |
| Higher Layer-configured (subband CQI) | Mode 3-0 | Mode 3-1 | |

In Table 2, Mode 2-0 or Mode 3-0 may correspond to PUSCH reporting mode having no PRI report (i.e., No PMI). In the following description, Mode 1-2, Mode 3-1 and Mode 2-2 for reporting PMI are explained in detail. In case that CSI is reported via PUSCH, channel coding for CSI may be performed by a coding unit. In the following description, assume that the total number of subbands of a system bandwidth is N.

PUSCH reporting mode 1-2 is the mode for reporting multi-PMI and wideband-CQI. In this case, PMI is determined/calculated for subband (SB), while CQI is determined/calculated for wideband (WB). Table 3 shows fields of CQI feedback for WB CQI report and corresponding bit widths in case of 2 or 4 antenna ports in PUSCH reporting mode 1-2.

TABLE 3

| | Bit width | | | |
|---|---|---|---|---|
| | | | 4 antenna ports | |
| | 2 antenna ports | | Rank = | |
| Field | Rank = 1 | Rank = 2 | 1 | Rank > 1 |
| Wideband CQI codeword 0 | 4 | 4 | 4 | 4 |
| Wideband CQI codeword 1 | 0 | 4 | 0 | 4 |
| Precoding matrix indicator | 2N | N | 4N | 4N |

In Table 3, codeword 0 and codeword 1 indicate two codewords in single-cell based PDSCH transmission. In particular, maximum 2 codeword transmissions are supported in single-cell based DL transmission and a status of a DL channel experienced by each codeword transmission may differ. Since CQI is defined as a value that reflects a reception SINR on the assumption of a case that there is a DL transmission in case of configuring a space channel using a prescribed PMI, CQI may be calculated for each codeword.

Table 4 shows fields of CQI feedback for WB CQI report and corresponding bit widths in case of 8 antenna ports in PUSCH reporting mode 1-2.

TABLE 4

| | Bit width | | | |
|---|---|---|---|---|
| Field | Rank = 1 | Rank = 2 | Rank = 3 | Rank = 4 |
| Wideband CQI codeword 0 | 4 | 4 | 4 | 4 |
| Wideband CQI codeword 1 | 0 | 4 | 4 | 4 |
| Wideband first PMI i1 | 4 | 4 | 2 | 2 |
| Subband second PMI i2 | 4N | 4N | 4N | 3N |

| | Bit width | | | |
|---|---|---|---|---|
| Field | Rank = 5 | Rank = 6 | Rank = 7 | Rank = 8 |
| Wideband CQI codeword 0 | 4 | 4 | 4 | 4 |
| Wideband CQI codeword 1 | 4 | 4 | 4 | 4 |
| Wideband first PMI i1 | 2 | 2 | 2 | 0 |
| Subband second PMI i2 | 0 | 0 | 0 | 0 |

In Table 4, unlike the PMI for the case of 2 or 4 antenna ports, PMI for a case of 8 antenna ports may be configured with wideband $1^{st}$ PMI (i1) and subband $2^{nd}$ PMI (i2). The $1^{st}$ PMI and the $2^{nd}$ PMI may correspond to W1 and W2 of the hierarchical codebook described with reference to Formula 12 to Formula 14, respectively. Field and bit width for the i1 (or W1) and field and bit width for the i2 (or W2) are shown in Table 4.

PUSCH reporting mode 3-1 is the mode for reporting single PMI and upper layer-set subband CQI. In this case, PMI is determined/calculated for wideband (WB), while CQI is determined/calculated for subband (SB). Table 5 shows fields of CQI feedback for SB CQI report and corresponding bit widths in case of 2 or 4 antenna ports in PUSCH reporting mode 3-1.

TABLE 5

| | Bit width | | | |
|---|---|---|---|---|
| | 2 antenna ports | | 4 antenna ports | |
| Field | Rank = 1 | Rank = 2 | Rank = 1 | Rank > 1 |
| Wide-band CQI codeword 0 | 4 | 4 | 4 | 4 |
| Subband differential CQI codeword 0 | 2N | 2N | 2N | 2N |
| Wide-band CQI codeword 1 | 0 | 4 | 0 | 4 |
| Subband differential CQI codeword 1 | 0 | 2N | 0 | 2N |
| Precoding matrix indicator | 2 | 1 | 4 | 4 |

Table 6 shows fields of CQI feedback for SB CQI report and corresponding bit widths in case of 8 antenna ports in PUSCH reporting mode 3-1.

TABLE 6

| | Bitwidth | | | |
|---|---|---|---|---|
| Field | Rank = 1 | Rank = 2 | Rank = 3 | Rank = 4 |
| Wideband CQI codeword 0 | 4 | 4 | 4 | 4 |
| Subband differential CQI codeword 0 | 2N | 2N | 2N | 2N |
| Wideband CQI codeword 1 | 0 | 4 | 4 | 4 |
| Subband differential CQI codeword 1 | 0 | 2N | 2N | 2N |
| Wideband first PMI i1 | 4 | 4 | 2 | 2 |
| Subband second PMI i2 | 4 | 4 | 4 | 3 |

| | Bitwidth | | | |
|---|---|---|---|---|
| Field | Rank = 5 | Rank = 6 | Rank = 7 | Rank = 8 |
| Wideband CQI codeword 0 | 4 | 4 | 4 | 4 |
| Subband differential CQI codeword 0 | 2N | 2N | 2N | 2N |
| Wideband CQI codeword 1 | 4 | 4 | 4 | 4 |
| Subband differential CQI codeword 1 | 2N | 2N | 2N | 2N |
| Wideband first PMI i1 | 2 | 2 | 2 | 0 |
| Subband second PMI i2 | 0 | 0 | 0 | 0 |

PUSCH mode 2-2 is the mode for reporting multi-PMI and subband CQI selected by a user equipment. In this case, CQI is determined/calculated by subband (SB) unit for wideband (WB) and M-selected subbands (SB). In particular, for the M-selected subbands, average PMI and corresponding CQI are reported and L-bit indicator may be transmitted together to indicate indexes of the M-selected subbands (SB). Table 7 shows fields of CQI feedback for SB CQI report and corresponding bit widths in case of 2 or 4 antenna ports in PUSCH reporting mode 2-2.

TABLE 7

| | Bit width | | | |
|---|---|---|---|---|
| | 2 antenna ports | | 4 antenna ports | |
| Field | Rank = 1 | Rank = 2 | Rank = 1 | Rank > 1 |
| Wide-band CQI codeword 0 | 4 | 4 | 4 | 4 |
| Subband differential CQI codeword 0 | 2 | 2 | 2 | 2 |
| Wide-band CQI codeword 1 | 0 | 4 | 0 | 4 |
| Subband differential CQI codeword 1 | 0 | 2 | 0 | 2 |
| Position of the M selected subbands | L | L | L | L |
| Precoding matrix indicator | 4 | 2 | 8 | 8 |

Table 8 shows fields of CQI feedback for SB CQI report and corresponding bit widths in case of 8 antenna ports in PUSCH reporting mode 2-2.

TABLE 8

| | Bit width | | | |
|---|---|---|---|---|
| Field | Rank = 1 | Rank = 2 | Rank = 3 | Rank = 4 |
| Wide-band CQI codeword 0 | 4 | 4 | 4 | 4 |
| Subband differential CQI codeword 0 | 2 | 2 | 2 | 2 |
| Wide-band CQI codeword 1 | 0 | 4 | 4 | 4 |
| Subband differential CQI codeword 1 | 0 | 2 | 2 | 2 |
| Position of the M selected subbands | L | L | L | L |
| Wideband first PMI i1 | 4 | 4 | 2 | 2 |
| Wideband second PMI i2 | 4 | 4 | 4 | 3 |
| Subband second PMI i2 | 4 | 4 | 4 | 3 |

| | Bit width | | | |
|---|---|---|---|---|
| Field | Rank = 5 | Rank = 6 | Rank = 7 | Rank = 8 |
| Wide-band CQI codeword 0 | 4 | 4 | 4 | 4 |
| Subband differential CQI codeword 0 | 2 | 2 | 2 | 2 |
| Wide-band CQI codeword 1 | 4 | 4 | 4 | 4 |
| Subband differential CQI codeword 1 | 2 | 2 | 2 | 2 |
| Position of the M selected subbands | L | L | L | L |
| Wideband first PMI i1 | 2 | 2 | 2 | 0 |
| Wideband second PMI i2 | 0 | 0 | 0 | 0 |
| Subband second PMI i2 | 0 | 0 | 0 | 0 |

Meanwhile, bit width applied in common to the PUSCH mode 1-2, the PUSCH mode 3-1 and the PUSCH mode 2-2 may be summarized into Table 9.

TABLE 9

| | Bit width | | |
|---|---|---|---|
| | | 4 antenna ports | |
| Field | 2 antenna ports | Max 2 layers | Max 4 layers |
| Rank indication | 1 | 1 | 2 |

| | Bit width 8 antenna ports | | |
|---|---|---|---|
| Field | Max 2 layers | Max 4 layers | Max 8 layers |
| Rank indication | 1 | 2 | 3 |

CSI Feedback on PUSCH

In a wireless communication system capable of supporting multi-cell operations, in order to support correct multi-cell operation (e.g., CoMP CS/CB operation, JP operation, etc.), it may be necessary for a user equipment to report CSI for each of multi-cells. This CSI feedback for multi-cells may be performed via PUSCH. Moreover, in the course of single-cell operation, it may be actually necessary to receive feedback of CSI for each multi-cell from a user equipment for the purpose of checking whether multi-cell operation is appropriate. According to the present invention, a method for CSI feedback for multi-cell is proposed by breaking from the conventional CSI feedback for single-cell.

PUSCH based CSI feedback method proposed by the present invention may be applicable to various kinds of multi-cell operations. In particular, the multi-cell operation may include CoMP operation, non-CoMP operation or dynamic cell selection (DCS) operation. In case of the CoMP operation, the principle of the present invention may identically apply to a case that one serving base station and one coordinating base station exist and a case that one serving base station and a plurality of coordinating base stations exist. And, the principle of the present invention may apply to an inter-site CoMP type in which a serving base station and coordinating base station(s) are located by being geographically spaced apart from each other, an intra-site CoMP type in which all base stations in a coordinating set are co-located, or a hybrid type of the inter-site CoMP type and the intra-site CoMP type. Moreover, the principle of the present invention may apply to a heterogeneous network environment in which a macro base station and a micro base station (e.g., femto base station) coexist.

Moreover, the PUSCH based CSI feedback method proposed by the present invention includes a cast of feeding back channel information on each cell in a coordinating set (e.g., a set of cells joining the multi-cell operation) as CSI for subband (SB) unit as well as a case of feeding back the channel information as CSI for wideband (WB).

According to the embodiments of the present invention, CoMP operation configured with one serving base station (S-eNB) and one coordinating base station (C-eNB) for clarity, by which the scope of the appended claims and their equivalents may be non-limited. In particular, as mentioned in the foregoing description, the principles described in this specification may apply to the various kinds of the multi-cell operations.

Compared to the single-cell based non-CoMP CSI report, CSI feedback for CoMP operation is additionally provided with CSI feedback for coordinating base station(s) (e.g., eNB(s)). Hence, a considerable amount of feedback overhead (e.g., bits used for transmission) may be required. Since transmission bits for the CSI feedback via PUCCH are limitedly smaller than those for the CSI feedback via PUSCH, a considerable amount of feedback information may be preferably transmitted on PUSCH. Hence, instead of performing the CoMP CSI feedback via periodic CSI report on PUCCH, if PUSCH is used, it may be advantageous for the CoMP CSI feedback. Therefore, according to the present invention, assume that a user equipment (UE) reports CoMP CSI feedback via PUSCH. In this case, the CSI feedback via PUSCH may be aperiodically triggered by a serving base station or may be periodically performed by a predetermined rule. The aperiodic PUSCH CSI feedback may be triggered by CSI request control information on DL control channel for example. The predetermined rule related to the periodic PUSCH CSI feedback may be configured through higher layer signaling or the like for example.

Although overhead of the PUSCH CSI feedback has a room more than that of the PUCCH CSI feedback, it may be preferable that the overhead of the CSI feedback is set as low as possible. Accordingly, the present invention proposes that report contents are discriminated in accordance with attribute when CoMP CSI feedback is performed via PUSCH. For instance, the contents may be reported in a manner of discriminating CSI for wideband (WB) and CSI for subband (SB) from each other, discriminating CSI of long-term attribute and CSI of short-term attribute from each other, or discriminating CSI for a serving base station and CSI for coordinating base station(s) from each other. Moreover, the CSI discriminated according to the attribute may be reported periodically or aperiodically. For instance, in case that aperiodic CoMP CSI feedback is requested by a serving base station, triggering bits (e.g., CSI request field) may be included in UL DCI format (e.g., PDCCH DCI format 0 or 4 related to UL grant). In this case, at least 2 bits are allocated to a size of CSI feedback triggering bits and a value of the triggering bits may indicate that a transmission of a prescribed CSI feedback in the above-discriminated repot contents is requested. And, a CSI request (e.g., triggering bit of UL DCI format) for triggering a CSI report in a subframe index n may be transmitted to a user equipment in a previous subframe (e.g., subframe index n-k).

1st Embodiment

1st embodiment relates to one example of a case that a bit size of CSI request field is set to 2 bits.

For instance, a value of a CSI request field according to a 1st embodiment may be defined as Table 10.

TABLE 10

| Value of CoMP CSI request field | Description |
|---|---|
| '00' | No aperiodic CSI report is triggered |
| '01' | Aperiodic non-CoMP CSI report triggered for serving cell |
| '10' | Aperiodic wideband and subband CoMP CSI report triggered including RI |
| '11' | Aperiodic subband CoMP CSI report triggered |

Referring to Table 10, a value '00' of a CSI request field indicates that there is no aperiodic CSI feedback request. A value '01' of the CSI request field indicates that an aperiodic non-CoMP CSI report for a channel from a serving cell is requested only. And, a value '10' or '11' of the CSI request field may indicate that a CoMP CSI report is requested. In this case, the value '10' of the CSI request field may indicate that a wideband and subband CoMP CSI report for a serving cell and coordinating cell(s) is requested together with a report of RI. And, the value '11' of the CSI request field may indicate that a report of SB CoMP CSI for a serving cell and coordinating cell(s) is requested. In particular, compared to the case of the CSI request field value '10', WB CSI and RI are excluded from the CSI reported in case of the CSI request field value '11'.

In doing so, values of RI and WB CSI are required for determining/calculating SB CSI. For instance, a corresponding result may vary in accordance with a fact that PMI is determined on the premise of a prescribed rank. And, a value of CQI may be determined differently in accordance with a fact that the CQI is based on which PMI. And, SB CSI (PMI/CQI) may be determined into a value differing in accordance with a fact that which WB CSI (PMI/CQI) is premised.

Hence, if SB CSI is individually reported only (i.e., without RI and WB CSI), it may be necessary to define that SB CSI is determined/calculated on the premise of what kinds of RI and CSI values.

According to the above example, the SB CoMP CSI, which is reported on condition that a value of the CSI request field is '11', may be determined/calculated on the assumption (or premise) of values of most recently reported RI and WB CoMP CSI. In this case, the most recently reported RI and WB CoMP CSI may correspond to RI and WB CoMP CSI reported on condition that a value of a latest CSI request field is '10'.

In case that the content of the CSI request is defined as Table 10, a bit width of CSI feedback reported by a user equipment may increase in order of '00', '01', '11' and '10' of the CSI request field values. In particular, a serving cell appropriately sets a value of a CSI request field, thereby adjusting a bit width (or feedback overhead) of CSI transmitted on PUSCH.

Moreover, it may be highly probable that CSI of WB attribute may not change longer than CSI of SB attribute. Hence, in case of the report of CoMP CSI shown in Table 10, if a base station directs a CSI request having a value '10' (i.e., highest feedback overhead in viewpoint of user equipment) less frequently than a CSI request having a value '11' (i.e., relatively low feedback overhead in viewpoint of user equipment), it may be able to receive a report of WB and SB attributes despite maintaining low CSI feedback overhead overall, if necessary.

Figure 7:
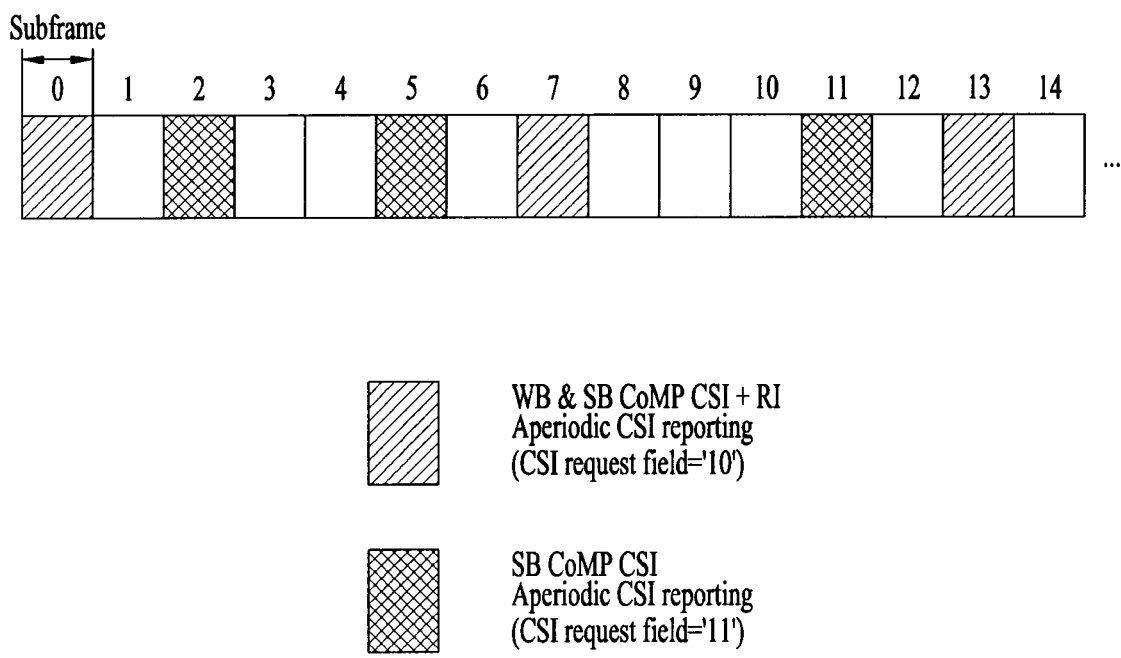
FIG. 7 is a diagram for one example of an aperiodic CoMP CSI report.

FIG. 7 is a diagram for one example of an aperiodic CoMP CSI report. In the aperiodic CSI report shown in FIG. 7 for example, control information for controlling a user equipment to report CSI in a subframe index (SI) n may be received in form of a CSI request (CSI triggering bit of UL DCI format) in a previous subframe (e.g., subframe index n-k) from a base station by the user equipment.

In the example shown in FIG. 7, WB CSI, SB CSI and RI for a serving cell and coordinating cell(s) are reported at each of the positions having SI (subframe index) values set to 0, 7 and 13 (SI=0, SI=7, and SI=13), respectively. This aperiodic CSI report may be indicated in a manner that a value of triggering bit (i.e., CSI request field) of UL grant DCI format in a previous subframe is set to '10'.

In the example shown in FIG. 7, at each of the positions (i.e., SI=2, SI=5, and SI=11), SB CoMP CSI for the serving cell and coordinating cell(s) is reported except RI and WB CoMP CSI. This aperiodic CSI report may be indicated in a manner that a value of triggering bit (i.e., CSI request field) of UL DCI format in a previous subframe is set to '11'. In this case, the SB CoMP CSI may be determined/calculated on the premise (or assumption) of the values of RI and WB CoMP CSI reported by a latest CSI request field having a value set to '10'. For instance, the SB CoMP CSI transmitted at 'SI=2' or 'SI=5' may be determined/calculated on the assumption of RI and WB CoMP CSI of 'SI=0'. For another instance, the SB CoMP CSI transmitted at 'SI=11' may be determined/calculated on the assumption of RI and WB CoMP CSI of 'SI=7'.

2nd Embodiment

2nd embodiment relates to another example of a case that a bit size of CSI request field is set to 2 bits. Although the 1st embodiment relates to the method of discriminating CSI report contents with reference to long term-wideband attribute or short term-subband attribute in case of reporting CoMP CSI instead of discriminating a report target (e.g., serving cell/coordinating cell), the 2nd embodiment relates to a method of discriminating CSI report contents with reference to a report target (e.g., serving cell/coordinating cell) in case of reporting CoMP CSI instead of discriminating long term-wideband attribute or short term-subband attribute.

For instance, a value of a CSI request field according to a $2^{nd}$ embodiment may be defined as Table 11.

TABLE 11

| Value of CoMP CSI request field | Description |
|---|---|
| '00' | No aperiodic CSI report is triggered |
| '01' | Aperiodic CSI report triggered for serving cell |
| '10' | Aperiodic CSI report triggered for coordinating cell(s) |
| '11' | Aperiodic CSI report triggered for serving and coordinating cell(s) |

Referring to Table 11, a value '00' of a CSI request field indicates that there is no aperiodic CSI feedback request. A value '01' of the CSI request field indicates that an aperiodic non-CoMP CSI report for a channel from a serving cell is requested. And, a value '10' of the CSI request field may indicate that an aperiodic CSI report for a channel from cooperating cell(s) is requested. And, a value '11' of the CSI request field may indicate that an aperiodic CSI report for channels from a serving cell and coordinating cell(s) is requested.

In the example of Table 11, in case of the CSI report for the coordinating cell(s) (i.e., in case that a value of the CSI request field is '10'), channel information on all coordinating cell(s) in a coordinating set is fully reported at a time. Alternatively, it may be able to agree the following in advance. First of all, a user equipment selects prescribed coordinating cell(s) from the coordinating set and then reports CSI for the selected coordinating cell(s) only together with index information of the selected coordinating cell. In order for the user equipment to select the prescribed coordinating cell(s), N coordinating cells having best channel status (i.e., bestON c-eNB) in viewpoint of the user equipment may be selected from the coordinating set, where N may be set to 1.

Instead of defining 2-bit CSI request field, as shown in Table 11, if a CSI request field of at least 3 bits is defined, an individual CSI report per coordinating cell may be requested.

According to the present embodiment, if a base station transmits a CSI report request to a user equipment in a manner of discriminating CSI for a service cell (or s-eNB) or a coordinating cell (or c-eNB), it may be able to utilize CSI feedback in CoMP situation more flexibly. According to the present embodiment, if a CSI report for all cells (e.g., serving cell and coordinating cell(s)) joining CoMP operation is necessary, a value of CSI request field is set to '11'. If a CSI report for some of coordinating cell(s) joining CoMP operation is necessary, a value of a CSI request field may be set to '10'. If a CSI for a serving cell is necessary only, a value of a CSI request field may be set to '01'. Thus, in case of falling back to non-CoMP mode or updating CSI per cell (or cell group), it may be able to make an appropriate CSI request. Compared to the case of reporting CSI for all cells joining CoMP operation, this case enables CSI for some cell(s) to be reported. Hence, in aspect of a user equipment, it may be able to reduce CSI feedback overhead.

Figure 8:
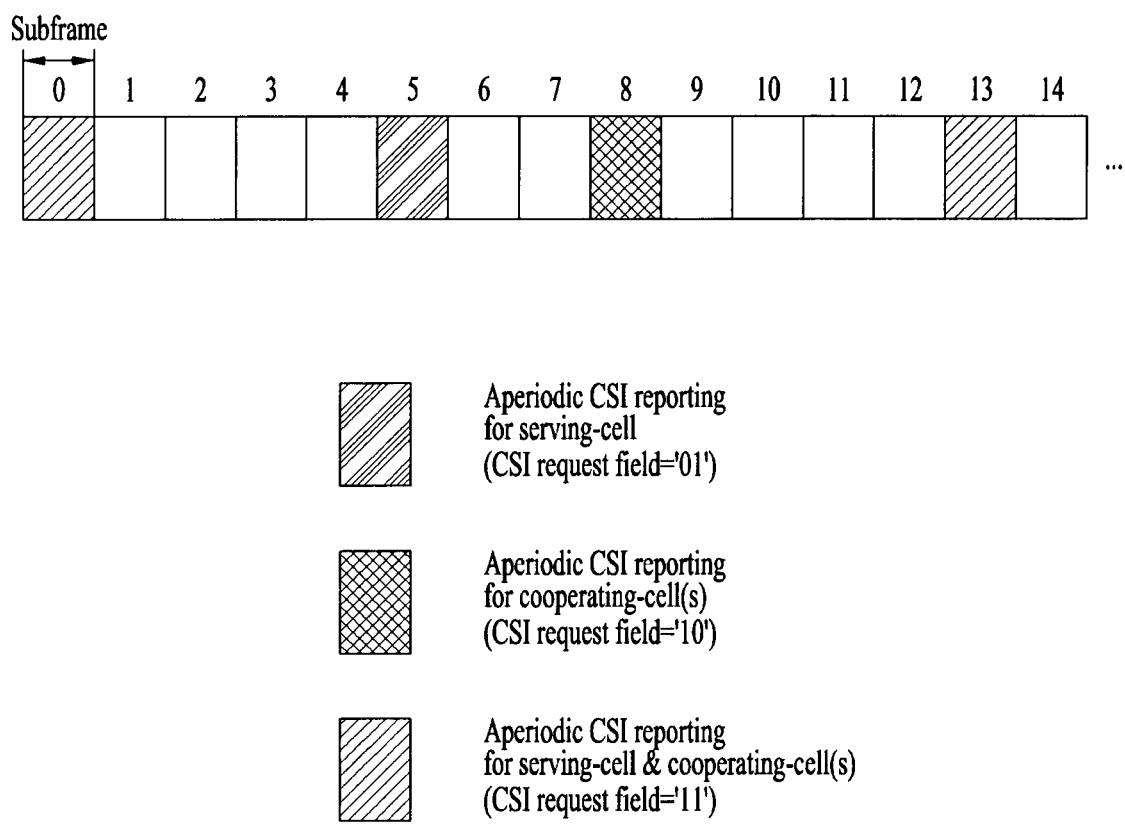
FIG. 8 is a diagram for another example of an aperiodic CoMP CSI report.

FIG. 8 is a diagram for another example of an aperiodic CoMP CSI report. In such an aperiodic CSI report as shown in FIG. 8, a user equipment may be able to receive CSI triggering bit, which enables a user equipment to report CSI at a subframe index (SI=n), in a previous frame (e.g., SI=n−k) from a base station.

In the example shown in FIG. 8, CSI of a serving cell and coordinating cell(s) may be reported at a position 'SI=0' or 'SI=13'. This aperiodic CSI report may be indicated in a manner that a value of a triggering bit (i.e., CSI request field) of UL grant DCI format in a previous subframe is set to '11'.

In the example shown in FIG. 8, CSI for a serving cell may be reported at 'SI=5'. And, CSI for coordinating cell(s) may be reported at 'SI=8'. This aperiodic CSI report may be indicated in a manner that a value of a triggering bit (i.e., CSI request field) of UL grant DCI format in a previous subframe is set to '01' or '10'.

In the example shown in FIG. 8, CSI reported for each cell (or base station) may report WB and SB CSIs for a corresponding cell (or base station) without discriminating WB and SB.

$3^{rd}$ Embodiment $3^{rd}$ embodiment relates to a periodic CSI report on PUSCH.

First of all, the above-mentioned $1^{st}$ or 2nd embodiment relates to a method of aperiodically reporting CSI on PUSCH in response to a request (e.g., triggering bit included in UL grant DCI format) made by a base station. Yet, according to a $3^{rd}$ embodiment, CSI may be reported on PUSCH by a predetermined cycle or period. Secondly, the above-mentioned $1^{st}$ or $2^{nd}$ embodiment relates to a method of reporting CSI of a specific type indicated by a base station in a manner of determining types of CSI reporting contents in advance. Yet, although the $3^{rd}$ embodiment is identical to the $1^{st}$ or $2^{nd}$ embodiment in that types of the CSI reporting contents are determined in advance, CSI of a specific type may be transmitted by a previously determined cycle or period according to the $3^{rd}$ embodiment.

Timing of reporting CSI on PUSCH may be determined by a transmission period parameter and an offset parameter. In this case, an offset may be understood as a start point of a CSI transmission period and may be defined as a value relative to a prescribed reference value. And, a user equipment may be informed of these parameters by higher layer (e.g., RRC) signaling. For instance, a CSI reporting period ($N_{pd\_WB}$) and subframe offset ($N_{offset\_WB}$) of WB attribute may be defined and a CSI reporting period ($N_{pd\_SB}$) and subframe offset ($N_{offset\_SB}$) of SB attribute may be separately defined. Alternatively, a CSI reporting period and offset per cell may be separately set. For instance, a CSI reporting period and offset for a serving cell are defined and a CSI reporting period and offset for coordinating cell(s) may be separately defined. Alternatively, parameters for the CSI reporting period and offset on PUSCH may be defined as re-construing or reusing the PUCCH reporting period and offset.

Figure 9:
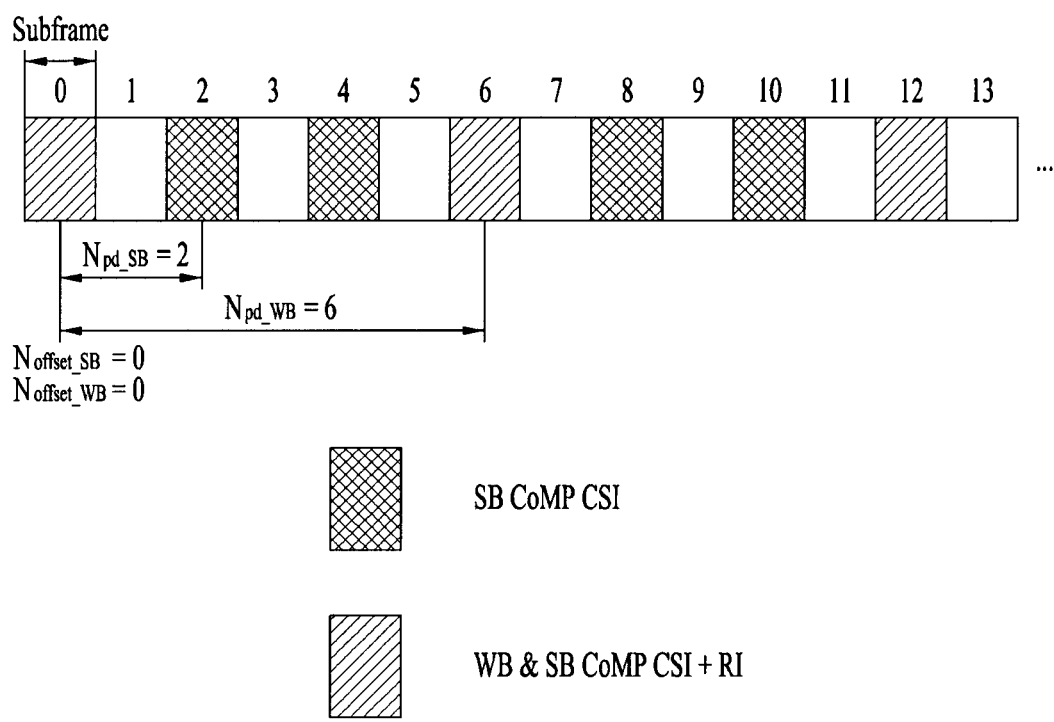
FIG. 9 is a diagram for one example of a periodic CoMP CSI report.

FIG. 9 is a diagram for one example of a periodic CoMP CSI report. In the example shown in FIG. 9, the reporting contents are classified into a WB CoMP CSI reporting type and an SB CoMP CSI reporting type. In the example shown in FIG. 9, a transmission period of SB CoMP CSI is 2 subframes ($N_{pd\_SB}=2$), an offset is zero ($N_{offset\_SB}=0$), a transmission period of WB CoMP CSI is 6 subframes ($N_{pd\_WB}=6$), and an offset is zero ($N_{offset\_WB}=0$). Hence, WB and SB CoMP CSIs may be reported at 'SI=0, 6 or 12'.

The above-mentioned types, reporting periods and offsets of the CoMP CSI reporting contents are just exemplary, by which the present embodiment may be non-limited. In particular, various examples of defining CoMP CSI reporting contents of various types and defining period and offset values per type of the CSI reporting content pertain to the scope of the appended claims and their equivalents.

4th Embodiment

Examples of CoMP CSI reporting types according to a 4th embodiment are described as follows.

First of all, types of CSI reporting contents may be reconfigured in various ways. As mentioned in the foregoing description, types of the reconfigured CSI reporting contents may apply to the aperiodic or periodic CoMP CSI report on PUSCH. In this case, the types of the CSI reporting contents may be determined in advance. In case of the aperiodic CoMP CSI report, the types of the CSI reporting contents are previously determined and shared between a base station and a user equipment. And, a mapping relation between each state of CSI triggering bit (CSI request field) and a type of CSI reporting content may be previously defined between the base station and the user equipment as well. Accordingly, the base station may be able to make a request for a CSI report of the corresponding type to the user equipment in a manner of setting the CSI triggering bit to a specific value. In case of the periodic CoMP CSI report, type of CSI reporting contents are previously determined and shared between a base station and a user equipment and a reporting period and offset are determined per type of the CSI reporting content. Accordingly, the user equipment may be informed of the reporting period and offset by higher layer signaling.

Table 12 shows examples of CSI reporting types.

TABLE 12

|  | serving cell | coordinating cell(s) | cell group |
|---|---|---|---|
| WB + SB | (1) S_all | (4) C_all | (7) CG_all |
| WB only | (2) S_wb | (5) C_wb | (8) CG_wb |
| SB only | (3) S_sb | (6) C_sb | (9) CG_sb |

Referring to Table 12, types of CSI reporting contents may be variously defined as following: (1) reporting both WB CSI and SB CSI for a serving cell (occasionally, together with RI); (2) reporting WB CSI for a serving cell only (occasionally, together with RI); (3) reporting SB CSI for a serving cell only; (4) reporting both WB CSI and SB CSI for coordinating cell(s) (occasionally, together with RI); (5) reporting WB CSI for coordinating cell(s) only (occasionally, together with RI); and (6) reporting SB CSI for coordinating cell(s) only. In this case, the coordinating cell(s) may be defined as a group consisting of one coordinating cell or a plurality of coordinating cells. And, the coordinating cell(s) may be determined by an instruction made by a base station or may be determined as coordinating cell(s) preferred by a user equipment.

Referring to Table 12, the types of the CSI reporting contents may further include the following examples including: (7) reporting both WB CSI and SB CSI for a cell group (occasionally, together with RI); (8) reporting WB CSI for a cell group only (occasionally, together with RI); and (9) reporting SB CSI for a cell group only. In this case, the cell group may be defined as consisting of a serving cell and at least one coordinating cell. The cell group may be designated by the base station or may be determined by a selection made by the user equipment.

In case of the aperiodic report, in case that 2-bit CSI triggering bits are defined, for example, one state of the 2-bit CSI triggering bits is mapped to 'no CSI report'. And, the remaining 3 states may be randomly mapped to 3 of (1) to (9), respectively. In this case, the CSI reporting contents mapped to the states of the CSI triggering bits are preferably selected in consideration of practical use frequency by a base station in single-cell operation and multi-cell operation, feedback overhead of user equipment and the like overall. The representative examples may correspond to the example show in Table 10 or Table 11.

In case of Table 10, when the state of the CSI triggering bit (i.e., CSI request field) is '11', it is defined as 'aperiodic subband CoMP CSI report triggered. This may be modified as follows. First of all, if the state of the CSI request field is '11', it may be defined as mapped to 'aperiodic wideband CoMP CSI report triggered'[Table 13].

TABLE 13

| Value of CoMP CSI request field | Description |
|---|---|
| '00' | No aperiodic CSI report is triggered |
| '01' | Aperiodic non-CoMP CSI report triggered for serving cell |
| '10' | Aperiodic wideband and subband CoMP CSI report triggered including RI |
| '11' | Aperiodic wideband CoMP CSI report triggered |

According to the example shown in Table 13, it may effectively apply to the case that a transmitting stage attempts to utilize WB CSI information only in accordance with a channel status or the like. And, it may be able to considerably reduce a bit width Of CSI feedback (or feedback overhead) on PUSCH.

Meanwhile, in case that 3-bit CSI triggering bits are defined, one state of the 2-bit CSI triggering bits is mapped to 'no CSI report'. And, the remaining 7 states may be randomly mapped to 7 of (1) to (9), respectively.

Since the cell group related to the (7) to (9) may be set in various forms, newly discriminated reporting contents are defined for the settings of cell group and may be mapped to states of the CSI triggering bits, respectively.

5th Embodiment

5th embodiment relates to one example of applying the present invention to a carrier aggregation (hereinafter abbreviated CA) system.

Carrier aggregation means a technique of bringing such an effect as using a band having a logically wide bandwidth in a manner of physically binding a plurality of bands together in frequency domain. In this case, a carrier corresponding to an aggregated unit may be named a component carrier (hereinafter abbreviated CC) or a cell. For instance, even if one cell or CC supports a bandwidth of 5 MHz, 10 MHz or 20 MHz, it may be able to support system bandwidth up to maximum 100 MHz by binding 5 cells or CCs to the maximum. The cell (or CC) corresponding to the aggregated unit may be set to a primary-cell (P-Cell) or a secondary-cell (S-Cell) in accordance with its attribute. The P-Cell may be independently allocated to or set for a user equipment and may be regarded as a cell for performing transmission and reception of major control informations (e.g., synchronization signal, UL control information, etc.). The S-Cell premises allocation/setting of the P-Cell and may be regarded as a cell additionally allocated to or set for a user equipment to provide an extended bandwidth. For instance, in case that aggregation of maximum 5 carriers is supported, it may be able to one P-Cell and maximum 4 S-Cells.

Aperiodic CSI triggering scheme in a carrier aggregation applied system may be defined as Table 14.

TABLE 14

| Value of CSI request field | Description |
| --- | --- |
| '00' | No aperiodic CSI report is triggered |
| '01' | Aperiodic CSI report triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

In Table 14, if a value of CSI request field is 01, a user equipment may be able to report CSI for a specific serving cell (e.g., P-Cell) only. If a value of CSI request field is 10, a user equipment may report CSI for a $1^{st}$ set of previously configured serving cells only. If a value of CSI request field is 11, a user equipment may report CSI for a $2^{nd}$ set of previously defined serving cells only. In particular, the $1^{st}$ set of the serving cells corresponds to a combination of P-Cells and the $2^{nd}$ set of the serving cells corresponds to a combination of S-Cells, which may be configured by higher layers.

The PUSCH aperiodic CoMP CSI reporting scheme according to the above-mentioned embodiments of the present invention may be combined with the CSI reporting scheme of the carrier aggregation (CA) system like the example shown in Table 14. In particular, instead of providing a type of the CSI reporting contents in CoMP operation and a type of the CSI reporting contents in CA separately, it may be able to define one CSI request field extensibly applicable to both CoMP and CA environments.

In particular, although the target of the CSI report indicated by the CSI request field in the example shown in Table 14 is limited to the CSI report for a serving cell, it may be able to extend the CSI reporting target to a cell that joins CoMP. The type of cells configuring the $1^{st}/2^{nd}$ set of serving cells, interpretation of the state of the CSI request field and the like in the example shown in Table 14 may be delivered to a user equipment by higher layer (e.g., RRC) signaling. For the CSI report for the CoMP joining cells, a set configured with CoMP cells is defined by the higher layer signaling and a mapping relation between CoMP CSI reporting content and CSI request field state may be defined. For instance, if CA is taken into consideration only, a set of serving cells defined for CA CSI is configured with P-Cell and S-Cell(s) in the example shown in Table 14 and the P-Cell and S-Cell(s) are limited to different carrier(s) within one same base station. Yet, if a case of applying CA and CoMP simultaneously is taken into consideration, S-Cell(s) may correspond to cell(s) belonging to a different base station on the same carrier. Hence, in case of considering both of the CA and the CoMP together, a serving cell in CoMP is interpreted as corresponding to P-Cell in CA and coordinating cell(s) in CoMP may be interpreted as corresponding to S-Cell(s) in CA. Thus, without modifying the interpretation of the CSI request field defined for the CA CSI report like Table 14, $1^{st}$ and $2^{nd}$ serving cell sets are defined to include CoMP cells by higher layer signaling and may be then used for CoMP CSI report.

For CSI report, a user equipment may be able to perform CSI measurement/calculation using CSI-RS. The user equipment may be informed of CSI-RS configuration (e.g., CSI-RS transmit subframe, CSI-RS pattern, etc.) of S-Cell(s) in CA supporting system by higher layer signaling on P-Cell. When the user equipment is informed of the CSI-RS configuration of specific S-Cell(s), if the corresponding S-Cell(s) belongs to different base station(s), The CSI request field shown in Table 14 or the like may be interpreted as CSI report for CoMP cells.

In case of applying CoMP to CA system, a method proposed by the present invention may be utilized for the efficient configuration of CoMP CSI reporting contents. In particular, one CSI request field (e.g., CSI report triggering bit) may be defined without discriminating CA and CoMP and its interpretation is defined using higher layer signaling or the like to enable efficient control information signaling.

For instance, assume a system defined with one P-Cell and one S-Cell. In case that the P-Cell and the S-Cell are defined on different carriers within a same base station, respectively, The same CA CSI reporting operation as Table 14 may be performed. On the contrary, in case that the P-Cell and the S-Cell correspond to different base stations on the same carrier, respectively, the CSI request field shown in Table 14 or the like may be interpreted as the CoMP CSI reporting contents and its reporting contents may be previously defined by higher layer signaling. For instance, in case of CoMP CSI report for CoMP CS/CB operation, it may previously define that CoMP user equipment reports CSI for P-Cell and CSI for S-Cell together. And, the CSI reporting contents for the S-Cell may be previously defined by higher layer signaling in a manner of becoming CoMP CQI achievable using the PMI reported for the P-Cell (i.e., CoMP CQI when the S-Cell transmits PDSCH to another user equipment using the PMI reported for the S-Cell). In case of CoMP CSI report for CoMP JP operation, it may previously define that CoMP user equipment reports CSI for P-Cell and CSI for S-Cell together. And, it may previously define that the CoMP CQI (when the P-Cell and the S-Cell simultaneously perform PDSCH transmission to the CoMP user equipment) is calculated and reported. Thus, the CoMP CSI reporting scheme of the present invention may apply in a manner of extending interpretation of the state of the aperiodic CSI report triggering bit in CA system.

Various CoMP CSI reporting contents (or reporting types) on PUSCH proposed by the above-mentioned embodiments of the present invention may be previously defined as new PUSCH reporting mode (i.e., new PUSCH reporting mode different from the PUSCH reporting mode shown in Table 2). In particular, after various PUSCH reporting modes corresponding to the various examples of the present invention have been defined in advance, if a base station makes a CSI request, a user equipment may perform an aperiodic PUSCH CoMP CSI report or a periodic PUSCH CoMP CSI report in accordance with a prescribed reporting period and offset.

Figure 10:
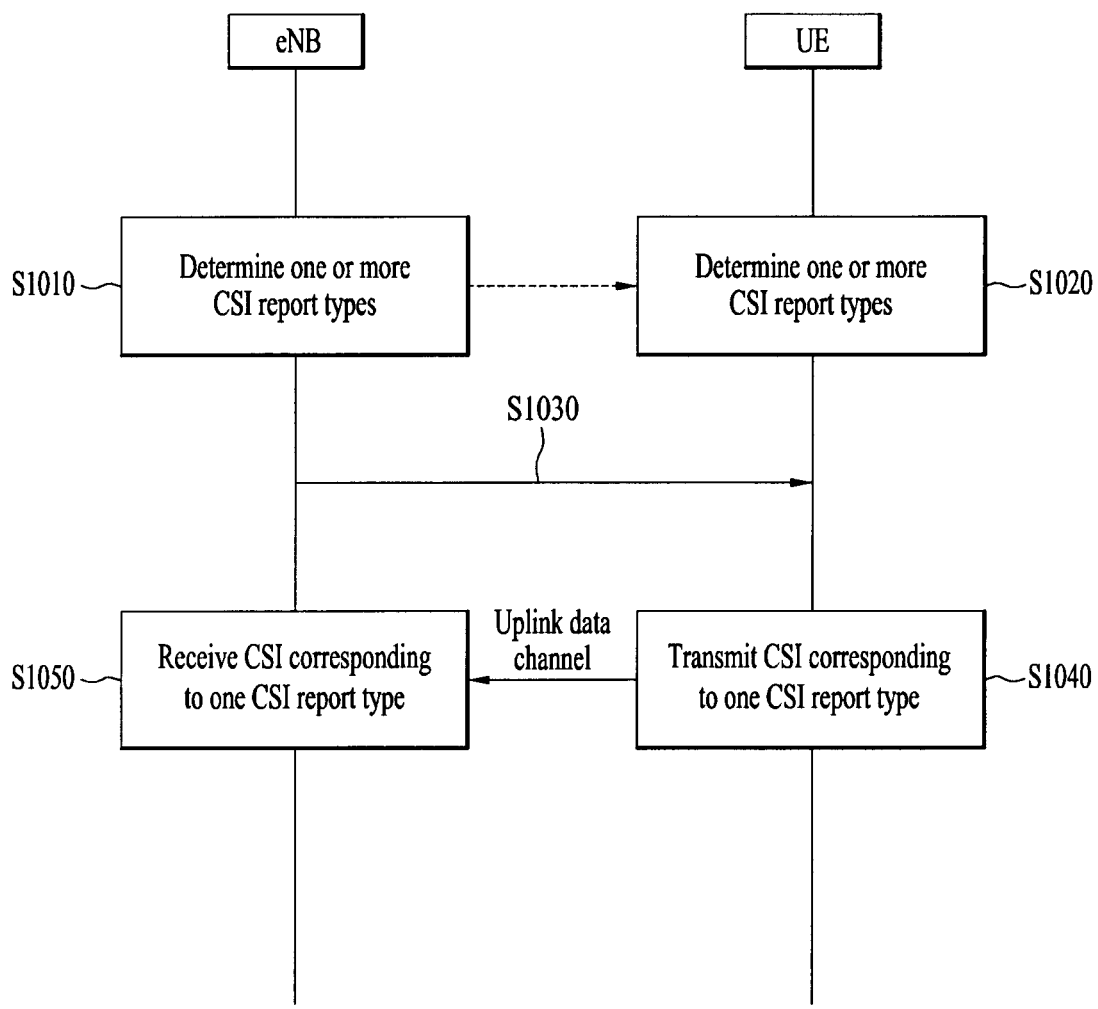
FIG. 10 is a flowchart for a method of transmitting and receiving channel status information according to one embodiment of the present invention.

FIG. 10 is a flowchart for a method of transmitting and receiving channel status information according to one embodiment of the present invention. In particular, CSI described with reference to FIG. 10 may mean the CSI used for such multi-cell operation as CoMP operation.

Referring to FIG. 10, a base station (eNB) is able to determine at least one or more CSI report types for multi-cell operation in a step S1010, and a user equipment (UE) is also able to determine at least one or more CSI report types in a step S1020. In particular, the step S1010 and the step S1020 may mean the settings previously determined between the base station and the user equipment. In this case, the step S1010 and the step S1020 may be performed in initialization operations of the base station and the user equipment, respectively. Alternatively, the base station determines the at least one or more CSI report types and then informs the user equipment of a corresponding result. Subsequently, in accordance with signaling of the base station, the user equipment may be able to determine at least one or more CSI report types. Hence, in order for FIG. 10 to show that the operations of the step S1010 and the step S1020 may be performed by the base station and the user equipment without separate signaling, respectively or that the operations of the step S1010 and the step S1020 may be performed in accordance with the signaling from the base station, a signal transmission from the base station to the user equipment is represented as a dotted line.

In the above description, the various examples of the above-mentioned examples of the present invention may apply to the at least one or more CSI report types. Basically, various kinds of CSI report types may be determined in accordance with various combinations of CSI report targets (e.g., serving cell, coordinating cell(s), cell group, etc.) and CSI attributes (e.g., wideband, subband, wideband & subband, etc.) in accordance with the example shown in Table 12 or the like. Preferably, CSI report types for multi-cell operation may be determined as the forms shown in Table 10 or Table 11. Alternatively, CSI report types may be configured in form similar to that of a cell set in an aperiodic CSI report used for CA system in configuring the cell set. And, one cell set in CSI report for multi-cell operation may include at least one of a serving cell and at least one coordinating cell.

In a step S1030, the base station may provide control information related to the multi-cell CSI report to the user equipment. For example, the control information may include control information (i.e., CSI triggering bit) for requesting CSI transmission and may be transmitted on PDCCH. Based on a value of the CSI request control information carried on PDCCH, the user equipment may be able to determine one CSI report type among the at least one or more CSI report types determined in the step S1020. Alternatively, the control information transmitted in the step S1030 may include information on a report period and offset of the CSI transmission for each of the at least one or more CSI report types and may be transmitted by higher layer signaling.

In a step S1040, the user equipment may be able to transmit a CSI corresponding to the determined one CSI report type. In case of receiving the CSI triggering bit from the base station in the step S1030, the CSI transmission in the step S1040 may be performed aperiodically. In particular, after the control information in the step S1030 has been received, the CSI transmission in the step S1040 may be performed after prescribed duration. Alternatively, in case of receiving the CSI report period and offset from the base station in the step S1030, the CSI transmission in the step S1040 may be performed periodically. In any cases, the report of the CSI used for the multi-cell operation may be carried on UL data channel (i.e., PUSCH). Therefore, in a step S1050, the base station may receive the CSI used for the multi-cell operation.

In the reference signal transmitting and receiving method according to the present invention described with reference to FIG. 10, the matters described in the various embodiments of the present invention may be independently applied or implemented in a manner of applying at least two embodiments simultaneously. And, the redundant contents shall be omitted for clarity.

Figure 11:
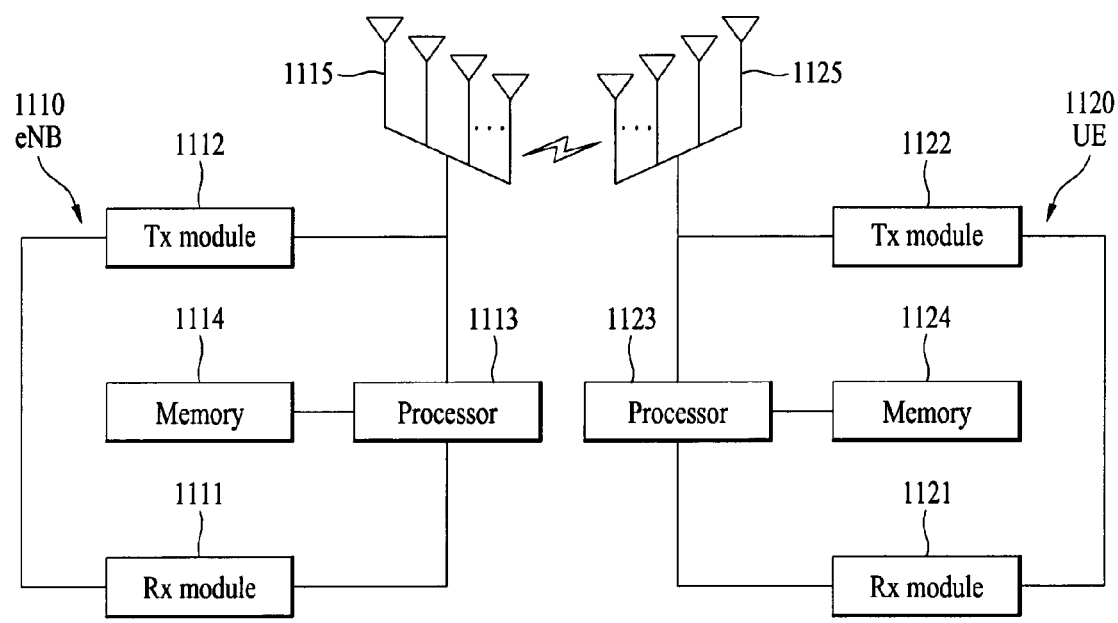
FIG. 11 is a diagram for configurations of a base station device and a user equipment device according to the present invention.

FIG. 11 is a diagram for configurations of a base station device and a user equipment device according to the present invention.

Referring to FIG. 11, a base station device 1110 according to the present invention may include a receiving module 1111, a transmitting module 1112, a processor 1113, a memory 1114 and a plurality of antennas 1115. In this case, a plurality of the antennas 1115 may mean a base station device that supports MIMO transmission and reception. The receiving module 1111 may receive various signals, data and informations in uplink from a user equipment. The transmitting module 1112 may transmit various signals, data and informa-tions in downlink to the user equipment. And, the processor 1113 may control overall operations of the base station device 1110.

The base station device 1110 according to one embodiment of the present invention may be configured to receive channel status information. The processor 1113 of the base station device may be configured to determine at least one CSI report type for CSI used for multi-cell operation. And, the processor 1113 may be configured to receive CSI corresponding to one of the at least one or more CSI report types from the user equipment via uplink data channel.

The processor 1113 of the base station device 1110 may perform a function of operating and processing information received by the base station device 1110, information to be transmitted externally by the base station device 1110 and the like. And, the memory 1114 may be able to store the operated and processed information and the like for prescribed duration and may be substituted with such a component as a buffer (not shown in the drawing) and the like.

Referring to FIG. 11, a user equipment device 1120 according to the present invention may include a receiving module 1121, a transmitting module 1122, a processor 1123, a memory 1124 and a plurality of antennas 1125. In this case, a plurality of the antennas 1125 may mean a user equipment device that supports MIMO transmission and reception. The receiving module 1121 may receive various signals, data and informations in downlink from a base station. The transmitting module 1122 may transmit various signals, data and informations in uplink to the base station. And, the processor 1123 may control overall operations of the user equipment device 1120.

The user equipment device 1120 according to one embodiment of the present invention may be configured to transmit channel status information. The processor 1123 of the user equipment device may be configured to determine at least one CSI report type for CSI used for multi-cell operation. And, the processor 1123 may be configured to transmit CSI corresponding to one of the at least one or more CSI report types to the base station via uplink data channel.

The processor 1123 of the user equipment device 1120 may perform a function of operating and processing information received by the user equipment device 1120, information to be transmitted externally by the user equipment device 1120 and the like. And, the memory 1124 may be able to store the operated and processed information and the like for prescribed duration and may be substituted with such a component as a buffer (not shown in the drawing) and the like.

Regarding the detailed configurations of the base station device and the user equipment device, the matters described in the various embodiments of the present invention may be independently applied or implemented in a manner of applying at least two embodiments simultaneously. And, the redundant contents shall be omitted for clarity.

The details of the base station device 1110 in the description with reference to FIG. 11 may be identically applicable to a relay node as a DL transmission subject or a UL reception subject. And, the details of the user equipment device 1120 in the description with reference to FIG. 11 may be identically applicable to a relay node as a DL reception subject or a UL transmission subject.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the above-mentioned embodiments of the present invention are applicable to various kinds of mobile communication systems.

What is claimed is:

1. A method of transmitting channel status information (CSI) at a user equipment (UE) in a wireless communication system, the method comprising:
   receiving, by the UE, control information including a coordinated multi-point (CoMP) CSI request field,
   wherein a bit size of the CoMP CSI request field is set to 2 bits, and
   wherein a serving cell and at least one coordinating cell exist when a CoMP system is applied;
   determining, by the UE, a CoMP CSI report type for the CSI based on a value of the CoMP CSI request field,
   wherein the determined CoMP CSI report type is distinguished by CSI report contents with reference to a report target, and
   wherein the determined CoMP CSI report type comprises a first CoMP CSI report type having content for the serving cell, a second CoMP CSI report type having content for the at least one coordinating cell, and a third CoMP CSI report type having content for the serving cell and the at least one coordinating cell; and
   transmitting, by the UE, the CSI corresponding to the determined CoMP CSI report type to a base station via an uplink data channel.

2. The method of claim 1, wherein the control information is received on a physical downlink control channel (PDCCH).

3. The method of claim 1, further comprising:
   receiving information on a report period and an offset of the CSI transmission for the determined CoMP CSI report type,
   wherein the CSI transmission is performed at a timing determined in accordance with the report period and the offset.

4. The method of claim 3, wherein the information on the report period and the offset is received via higher layer signaling.

5. The method of claim 1, wherein the determined CoMP CSI report type is set by higher layer signaling or determined in advance.

6. The method of claim 1, wherein the determined CoMP CSI report type comprises a wideband and subband CoMP CSI report type and a subband CoMP CSI report type.

7. The method of claim 1, wherein the determined CoMP CSI report type comprises a CoMP CSI report type for a first cell set and a CoMP CSI report type for a second cell set.

8. The method of claim 7, wherein each of the first cell set and the second cell set comprises at least one cell among a serving cell and at least one coordinating cell joining a multi-cell operation.

9. The method of claim 8, wherein cells of the multi-cell operation belong to a same base station or a plurality of base stations.

10. The method of claim 1, wherein the uplink data channel comprises a physical uplink shared channel (PUSCH).

11. A method of receiving channel status information (CSI) at a base station (BS) in a wireless communication system, the method comprising:
   receiving, by the BS, a CSI corresponding to a determined coordinated multi-point (COMP) CSI report type from a user equipment via an uplink data channel,
   wherein the CoMP CSI report type for the CSI is determined based on a value of a CoMP CSI request field included in a control information,
   wherein a bit size of the CoMP CSI request field is set to 2 bits and the CoMP CSI report type is distinguished by the CSI report contents with reference to a report target, and
   wherein the CoMP CSI report type comprises a first CoMP CSI report type having content for a serving cell, a second CoMP CSI report type having content for at least one coordinating cell, and a third CoMP CSI report type having content for the serving cell and the at least one coordinating cell.

12. A user equipment for transmitting channel status information (CSI) in a wireless communication system, the user equipment comprising:
   a receiving module configured to receive a downlink signal from a base station,
   wherein the receiving module receives control information including a coordinated multi-point (CoMP) CSI request field,
   wherein a bit size of the CoMP CSI request field is set to 2 bits, and wherein a serving cell and at least one coordinating cell exist when a CoMP system is applied;
a processor configured to:
determine a CoMP CSI report type for the CSI based on a value of the CoMP CSI request field,
wherein the CoMP CSI report type is distinguished by CSI report contents with reference to a report target, and
wherein the CoMP CSI report type comprises a first CoMP CSI report type having content for the serving cell, a second CoMP CSI report type having content for the at least one coordinating cell, and a third CoMP CSI report type having content for the serving cell and the at least one coordinating cell; and
a transmitting module configured to transmit an uplink signal to the base station,
wherein the transmitting module transmits the CSI corresponding to the determined CoMP CSI report type to the base station via an uplink data channel.

13. A base station for receiving channel status information (CSI) in a wireless communication system, the base station comprising:
a receiving module configured to receive an uplink signal from a user equipment,
wherein the receiving module receives a CSI corresponding to a determined coordinated multi-point (CoMP) CSI report type from the user equipment via an uplink data channel,
wherein the CoMP CSI report type for the CSI is determined based on a value of a CoMP CSI request field included in a control information,
wherein a bit size of the CoMP CSI request field is set to 2 bits and the CoMP CSI report type is distinguished by CSI report contents with reference to a report target, and
wherein the CoMP CSI report type comprises a first CoMP CSI report type having content for a serving cell, a second CoMP CSI report type having content for at least one coordinating cell, and a third CoMP CSI report type having content for the serving cell and the at least one coordinating cell;
a transmitting module configured to transmit a downlink signal to the user equipment; and
a processor configured to control the receiving module and the transmitting module.

* * * * *